US011827486B2

(12) United States Patent
Ogino et al.

(10) Patent No.: US 11,827,486 B2
(45) Date of Patent: Nov. 28, 2023

(54) IMAGE FORMING APPARATUS AND IMAGE FORMING SYSTEM CONFIGURED TO DETERMINE OPERATION

(71) Applicant: CANON KABUSHIKI KAISHA, Tokyo (JP)

(72) Inventors: Kosuke Ogino, Susono (JP); Hajime Sugaya, Numazu (JP); Hiroshi Hagiwara, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 664 days.

(21) Appl. No.: 16/836,499

(22) Filed: Mar. 31, 2020

(65) Prior Publication Data

US 2020/0324990 A1  Oct. 15, 2020

(30) Foreign Application Priority Data

Apr. 10, 2019 (JP) ................ 2019-074990

(51) Int. Cl.
  *B65H 7/06* (2006.01)
  *B65H 43/04* (2006.01)
  *B65H 5/06* (2006.01)
  *G03G 15/00* (2006.01)

(52) U.S. Cl.
  CPC ............ *B65H 7/06* (2013.01); *B65H 5/062* (2013.01); *B65H 43/04* (2013.01); *G03G 15/70* (2013.01); *B65H 2220/03* (2013.01)

(58) Field of Classification Search
  CPC ........... B65H 2515/82; B65H 2553/30; B65H 5/062; B65H 43/04; B65H 2220/03; B65H 2511/52; B65H 7/06; G03G 2215/00637; G03G 15/55; G03G 15/70; B41J 29/393; B41J 2/0451; G06F 3/1229
  See application file for complete search history.

(56) References Cited

U.S. PATENT DOCUMENTS

| 2007/0070456 A1* | 3/2007 | Nishimura ......... H04N 1/00037 358/504 |
| 2017/0199164 A1* | 7/2017 | Shirata .................... G01M 7/00 |

FOREIGN PATENT DOCUMENTS

| JP | 2004-226482 A |   | 8/2004 |
| JP | 2006-184722 A |   | 7/2006 |
| JP | 2006208074 A | * | 8/2006 |
| JP | 2008-032948 A |   | 2/2008 |
| JP | 2008-304872 A |   | 12/2008 |
| JP | 2017-149536 A |   | 8/2017 |
| JP | 2019-142634 A |   | 8/2019 |

* cited by examiner

*Primary Examiner* — Luis A Gonzalez
(74) *Attorney, Agent, or Firm* — Canon U.S.A., Inc. I.P. Division

(57) ABSTRACT

An image forming apparatus includes a conveyance unit, a detection unit, and a determination unit. The conveyance unit conveys a sheet. The detection unit detects a sound that emanates when the conveyance unit operates. The determination unit performs state determination. In a case where a volume of a sound detected by the detection unit is not higher than or equal to a predetermined sound volume, the determination unit determines that the conveyance unit is not normally operating. In a case where the detected sound volume is higher than or equal to the predetermined sound volume, the determination unit determines that the conveyance unit is normally operating.

8 Claims, 15 Drawing Sheets

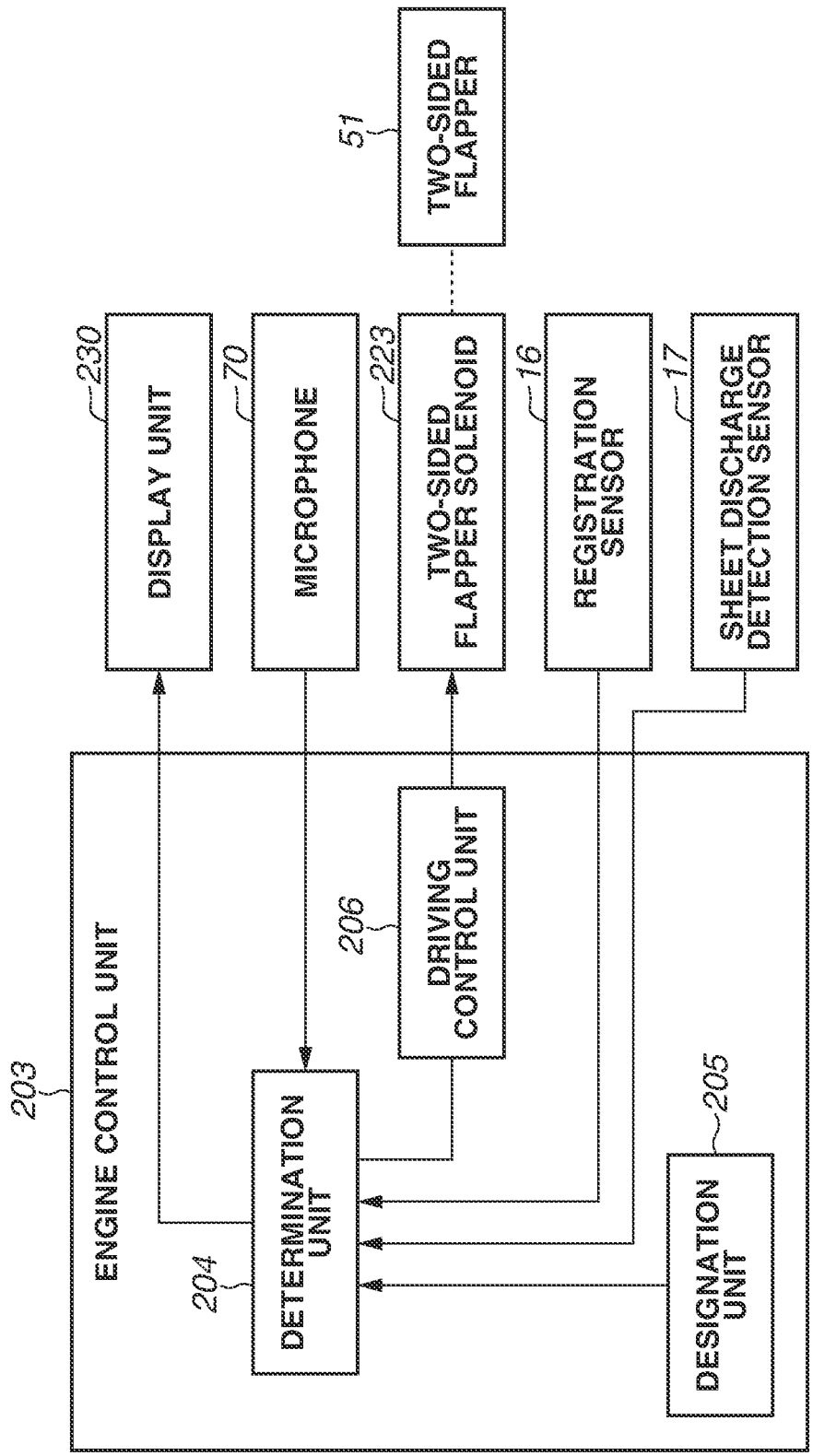

DURING NORMAL OPERATION

DURING ABNORMAL OPERATION

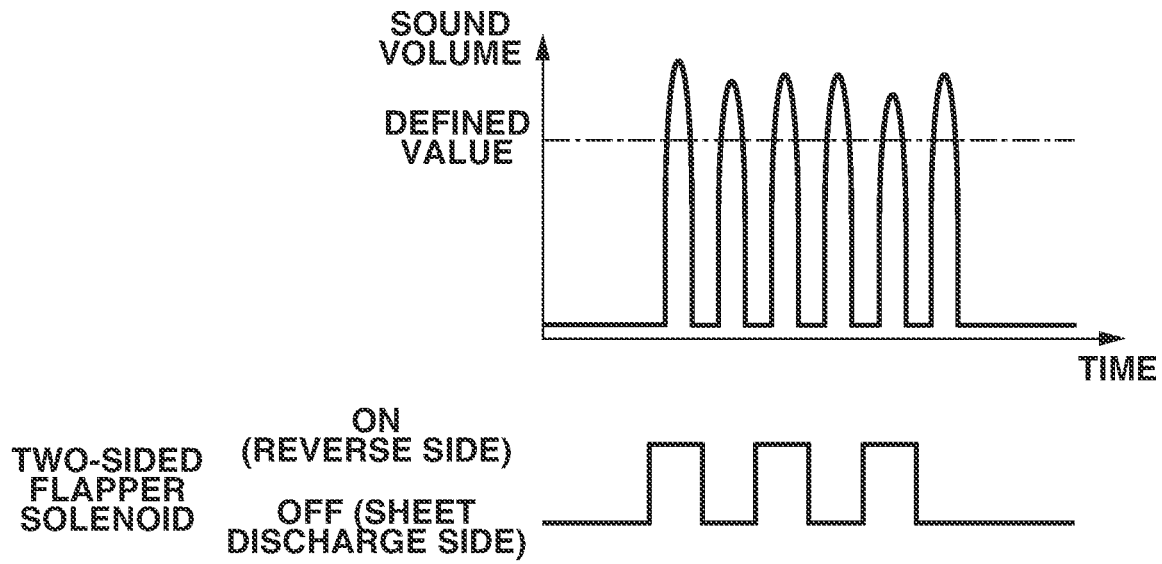
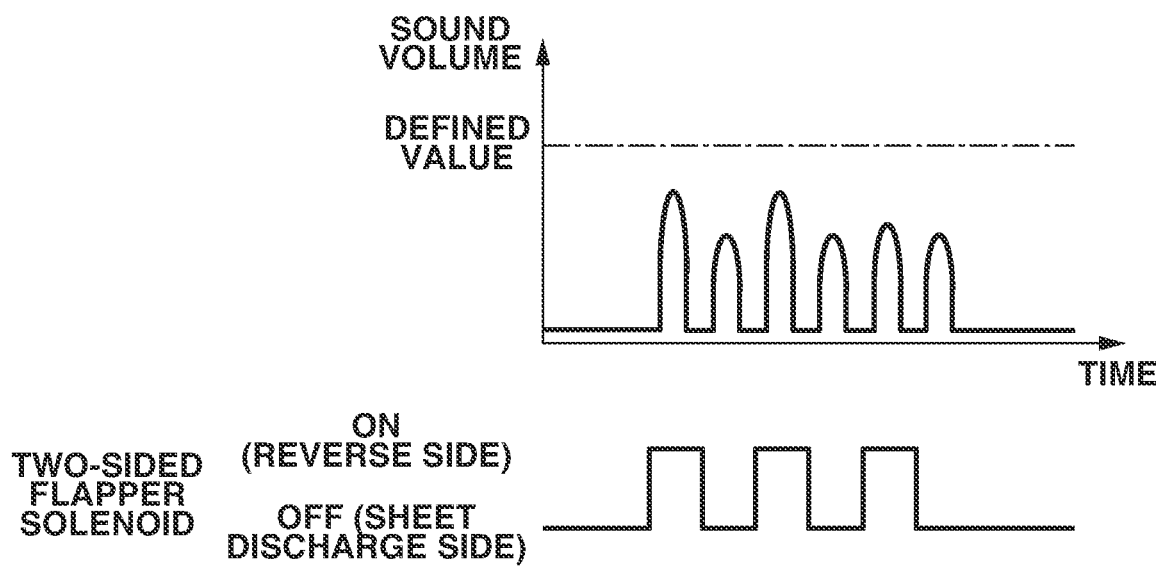

DURING NORMAL OPERATION

DURING ABNORMAL OPERATION

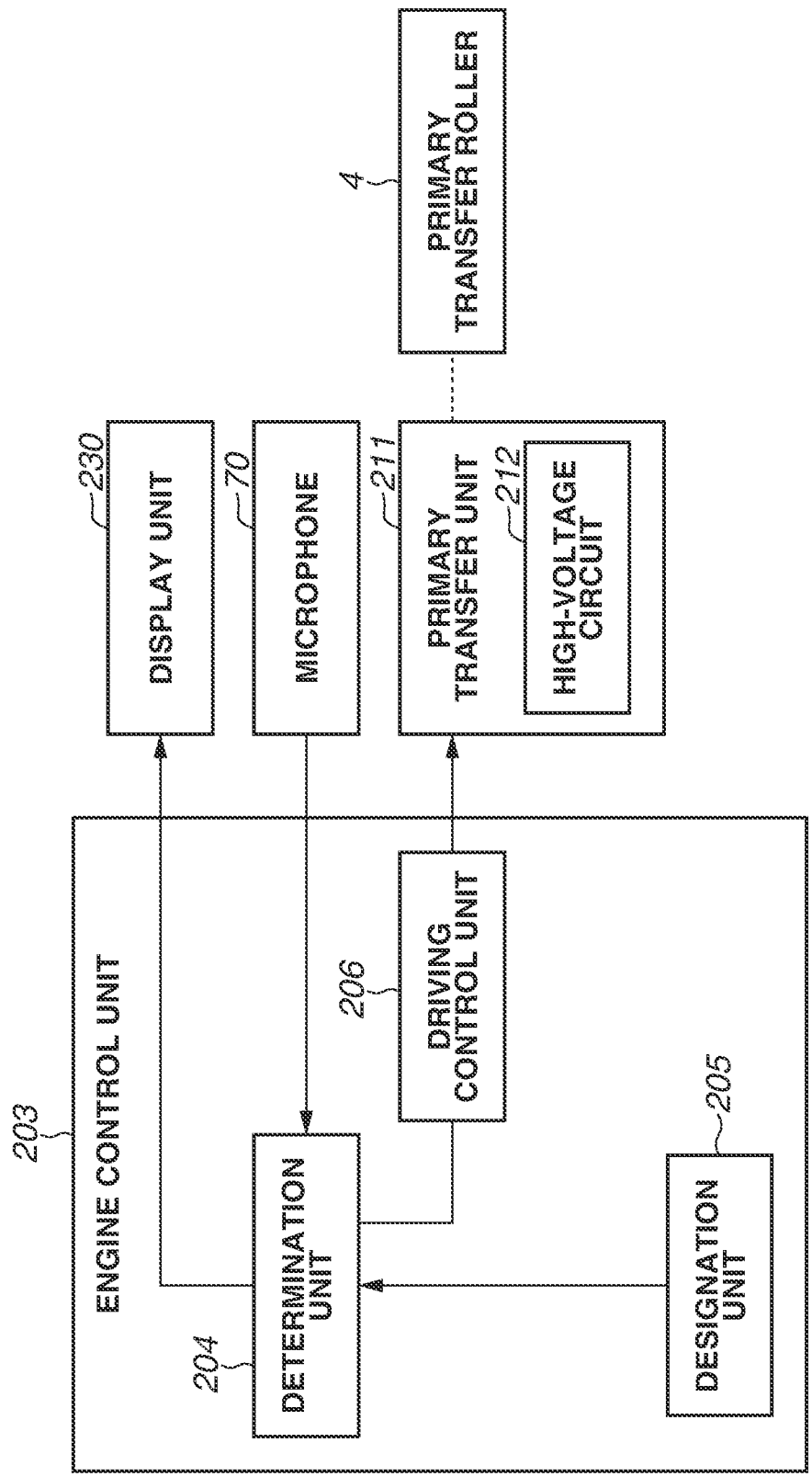

DURING NORMAL OPERATION

DURING ABNORMAL OPERATION

DURING NORMAL OPERATION

DURING ABNORMAL OPERATION

IMAGE FORMING APPARATUS AND IMAGE FORMING SYSTEM CONFIGURED TO DETERMINE OPERATION

BACKGROUND

Field

The present disclosure relates to an image forming apparatus and an image forming system that determine a state of a part based on a sound emanating from the part during an operation.

Description of the Related Art

An image forming apparatus such as a copying machine or a laser printer includes a plurality of parts. After the parts are used for a long time, for example, the state of the parts can change, and when the image forming apparatus is operated, a louder sound than a sound that emanates during a normal operation may emanate from the parts.

Japanese Patent Application Laid-Open No. 2004-226482 discusses a technique in which if a sound that emanates from a part becomes louder than a sound that emanates during a normal operation, an abnormality is detected, and the part from which the sound emanates is detected.

However, the change is not only such a change that the sound that emanates from a part becomes louder when the state of the part changes. In other words, the technique discussed in Japanese Patent Application Laid-Open No. 2004-226482 may not be able to detect a change in the state of a part in a case where a sound that emanates from the part does not become louder but changes in a different way when the state of the part changes.

SUMMARY

According to an aspect of the present disclosure, an image forming apparatus includes a conveyance unit configured to convey a sheet, a detection unit configured to detect a sound that emanates when the conveyance unit operates, and a determination unit configured to perform state determination, wherein, in a case where a volume of a sound detected by the detection unit is not higher than or equal to a predetermined sound volume, the determination unit determines that the conveyance unit is not normally operating, and wherein, in a case where the detected sound volume is higher than or equal to the predetermined sound volume, the determination unit determines that the conveyance unit is normally operating.

Further features of the present disclosure will become apparent from the following description of exemplary embodiments with reference to the attached drawings.

BRIEF DESCRIPTION OF THE DRAWINGS

FIG. 3 is a control block diagram illustrating a system configuration of the image forming apparatus.

FIGS. 6A and 6B are views illustrating a process in the state determination.

FIG. 11 is a control block diagram illustrating a system configuration of the image forming apparatus.

DESCRIPTION OF THE EMBODIMENTS

Figure 1:
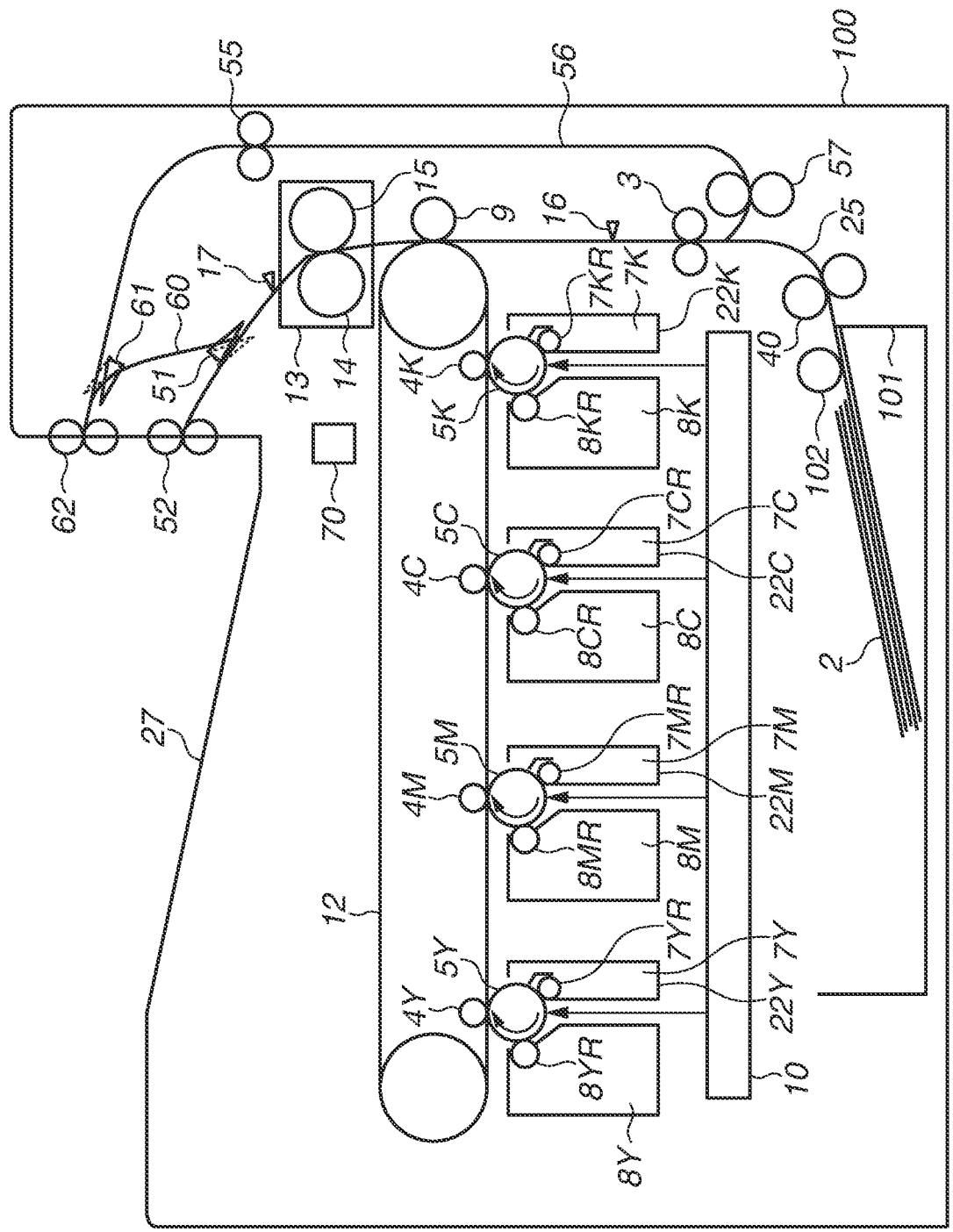
FIG. 1 is a view illustrating an entire configuration of an image forming apparatus.

Various exemplary embodiments will be described in detail below with reference to the attached drawings. It should be noted that the below-described exemplary embodiments are not intended to limit the scope of the embodiments. While a plurality of features is described in the exemplary embodiments, not every one of the plurality of features is always essential, and the plurality of features may be combined as needed. Further, the same or similar components are given the same reference numerals in the attached drawings to avoid repetition of descriptions.

The present disclosure is applicable to at least a single image forming apparatus and an image forming system consisting of a plurality of apparatuses. The present disclosure is applicable to an image forming system connected via a network, such as a local area network (LAN) or wide area network (WAN), and configured to perform processing. In other words, each system configuration according to below-described exemplary embodiments in which various apparatuses are connected is a mere example, and there are various possible configuration examples.

A first exemplary embodiment to which the present disclosure is applicable will be described below.

<Configuration of Image Forming Apparatus>

FIG. 1 illustrates an entire configuration of an image forming apparatus 100 according to the present exemplary embodiment. In FIG. 1, the letters "Y", "M", "C", and "K" at ends of reference numerals indicate that the toner colors for which the corresponding members are involved in forming are yellow, magenta, cyan, and black, respectively. In the following description, when it is unnecessary to discriminate among the colors, the reference numerals are used without the letters at the end.

A photosensitive drum 5 is driven and rotated clockwise during image forming. A charging unit 7 includes a charging roller 7R, and the charging roller 7R charges a surface of the photosensitive drum 5 to a predetermined potential. An optical unit 10 exposes the photosensitive drum 5 and forms an electrostatic latent image on the photosensitive drum 5. A development unit 8 contains a developer and develops the electrostatic latent image on the photosensitive drum 5 using a development roller 8R so that a developer image is formed. The photosensitive drum 5, the charging unit 7, and the development unit 8 are held by a cartridge 22, which is attachable to and removable from the image forming apparatus 100.

A primary transfer unit 211 as an application unit includes a high-voltage circuit 212 and applies a primary transfer voltage output from the high-voltage circuit 212 to a primary transfer roller 4. The primary transfer roller 4 outputs the primary transfer voltage and transfers the developer image on the photosensitive drum 5 onto an intermediate transfer belt 12. The developer images formed on the photosensitive drums 5Y, 5M, 5C, and 5K are transferred and superimposed on the intermediate transfer belt 12 to thereby form a full-color developer image on the intermediate transfer belt 12. The transferred developer image on the intermediate transfer belt 12 is conveyed to a position facing a secondary transfer roller 9.

Meanwhile, a sheet feeding motor (not illustrated) of a cassette sheet feeding tray 101 attracts a sheet feeding solenoid (not illustrated) while being rotated so that a sheet feeding roller 102 and a sheet feeding/conveying roller 40 are rotated. A sheet 2 is conveyed to a registration roller 3 along a sheet conveyance path 25 and conveyed to the secondary transfer roller 9 by the registration roller 3. The image forming apparatus 100 detects leading and trailing edges of the sheet 2 being conveyed by a registration sensor 16 as a sheet detection unit to thereby determine that the sheet 2 is conveyed from the cassette sheet feeding tray 101. The secondary transfer roller 9 outputs a secondary transfer voltage and transfers the developer image on the intermediate transfer belt 12 onto the sheet 2.

After the developer image is transferred, the sheet 2 is conveyed to a fixing unit 13. The fixing unit 13 includes a fixing roller 14 and a pressing roller 15. The fixing roller 14 heats the sheet 2, and the pressing roller 15 presses the sheet 2 against the fixing roller 14. The fixing unit 13 presses and heats the sheet 2 so that the developer image is fixed to the sheet 2. After the developer image is fixed, the sheet 2 is discharged onto a sheet discharge unit 27, and the image forming is ended.

The image forming apparatus 100 includes a microphone 70. The microphone 70 detects a sound in the image forming apparatus 100 and is used to identify an abnormal portion of the image forming apparatus 100. While the microphone 70 is described as a detection unit in the present exemplary embodiment, the detection unit can be any other apparatus capable of detecting a sound in the image forming apparatus 100, such as an ultrasonic reception apparatus.

The image forming apparatus 100 includes a mechanism for reversely conveying the sheet 2 to form an image on a second surface of the sheet 2 after an image is formed on a first surface of the sheet 2. In the present exemplary embodiment, the image forming apparatus 100 includes a reverse roller 62, which is normally rotated and reversely rotated by the driving force of a reverse motor (not illustrated). The reverse roller 62 reverses the sheet 2 conveyed from a two-sided sheet conveyance path 60 as the reverse motor is reversely rotated, and the reversed sheet 2 is conveyed to a two-sided sheet conveyance path 56. The image forming apparatus 100 includes a two-sided conveyance roller 55 and a two-sided refeeding roller 57, and the two-sided conveyance roller 55 and the two-sided refeeding roller 57 receive driving force from a two-sided conveyance motor (not illustrated) and are rotated. The two-sided conveyance roller 55 and the two-sided refeeding roller 57 convey the sheet 2 conveyed reversely from the reverse roller 62 along the two-sided sheet conveyance path 56 so that the sheet 2 joins a portion of the sheet conveyance path 25.

The image forming apparatus 100 includes a two-sided flapper 51, and the two-sided flapper 51 guides the sheet 2 conveyed from the fixing unit 13 to one of a sheet discharge roller 52 and the reverse roller 62. The position of the two-sided flapper 51 is switched by operating a two-sided flapper solenoid 223, and the sheet 2 is guided to one of the sheet discharge roller 52 and the reverse roller 62. In the present exemplary embodiment, a conveyance unit refers to the two-sided flapper 51 and the two-sided flapper solenoid 223. In the present exemplary embodiment, the two-sided flapper 51 is configured so that the sheet 2 is guided to the reverse roller 62 when the two-sided flapper solenoid 223 is pulling (ON) whereas the sheet 2 is guided to the sheet discharge roller 52 when the two-sided flapper solenoid 223 is not pulling (OFF).

The image forming apparatus 100 determines that the sheet 2 is conveyed to the sheet discharge roller 52 or the reverse roller 62 by detecting the leading and trailing edges of the sheet 2 being conveyed by a sheet discharge detection sensor 17 as a sheet detection unit.

The sheet 2 guided to the two-sided sheet conveyance path 60 is conveyed by the fixing roller 14 and the pressing roller 15 and reaches a switching member 61 at a position specified by a solid line. Thereafter, while pushing the switching member 61 upward, the sheet 2 reaches the reverse roller 62, and the leading edge of the sheet 2 extends from the image forming apparatus 100. After the trailing edge of the sheet 2 passes through the switching member 61 and before the trailing edge of the sheet 2 reaches a two-sided reverse position at a predetermined distance to the reverse roller 62, the switching member 61 is returned from a position specified by a broken line in FIG. 1 to the position specified by the solid line in FIG. 1 due to the weight of the switching member 61. The switching member 61 is returned to the position specified by the solid line in FIG. 1 so that when the reverse roller 62 is reversely rotated, the sheet 2 is conveyed to the two-sided sheet conveyance path 56 along an upper surface of the switching member 61.

Figure 2:
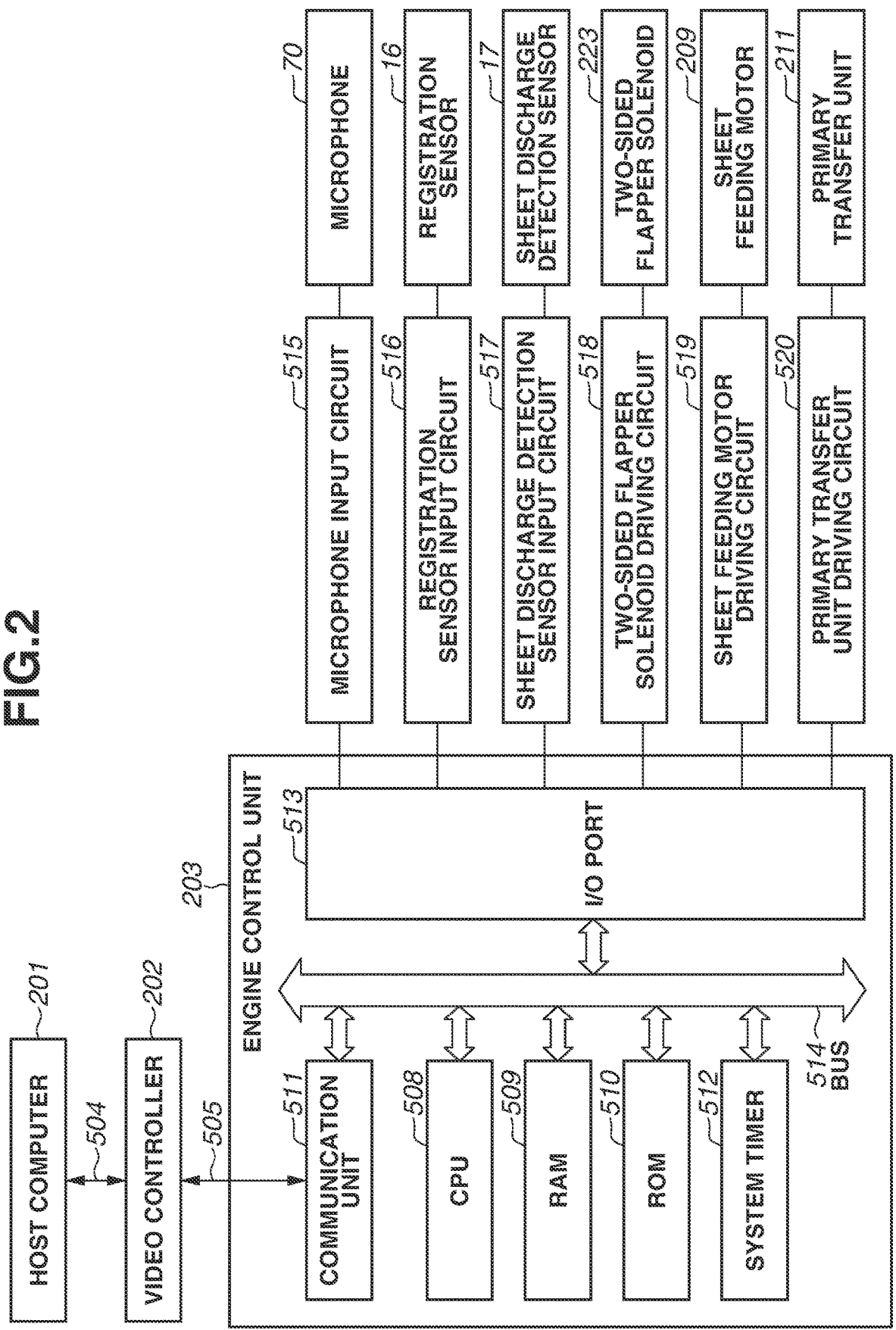
FIG. 2 is a view illustrating a hardware configuration.

FIG. 2 is a view illustrating a hardware configuration of the image forming apparatus 100, mainly an apparatus configuration involved in the control according to the present exemplary embodiment. A video controller 202 receives print data from a host computer 201, converts the received print data into video signal data, and transmits the converted print data to an engine control unit 203 configured to control the image forming apparatus 100. A communication line 504 is, for example, a communication line between the host computer 201 and the video controller 202 for communicating print data. A communication line 505 is, for example, a communication line between the video controller 202 and the engine control unit 203 for communicating video signal data. During image forming, the video controller 202 controls image processing by transmitting a command to the engine control unit 203 based on an instruction from the host computer 201 and receiving status data from the engine control unit 203.

The engine control unit 203 is a control integrated circuit (control C) configured such that a central processing unit (CPU) 508, a random access memory (RAM) 509, a read-only memory (ROM) 510, a communication unit 511, a system timer 512, and an input/output (I/O) port 513 are connected via a bus 514. The CPU 508 controls various operations of the image forming apparatus 100. The RAM 509 temporarily stores control data necessary for an operation of the image forming apparatus 100. The ROM 510 stores a program and a control table necessary for an operation of the image forming apparatus 100 in a non-volatile manner. The communication unit 511 communicates with the video controller 202. The system timer 512 generates a timing necessary for various types of control. The I/O port 513 performs input and output of a control signal to various units in the image forming apparatus 100.

A microphone input circuit 515 transmits a signal from the microphone 70 to the engine control unit 203. A registration sensor input circuit 516 transmits a signal from the registration sensor 16 to the engine control unit 203. A sheet discharge detection sensor input circuit 517 transmits a signal from the sheet discharge detection sensor 17 to the engine control unit 203. A two-sided flapper solenoid driving circuit 518 receives a control signal for driving the two-sided flapper solenoid 223 from the engine control unit 203 and drives the two-sided flapper solenoid 223. A sheet feeding motor driving circuit 519 receives a control signal for driving a sheet feeding motor 209 from the engine control unit 203 and drives the sheet feeding motor 209. A primary transfer unit driving circuit 520 receives a control signal for driving the primary transfer unit 211 from the engine control unit 203 and drives the primary transfer unit 211.

<Configuration of Control Unit of Image Forming Apparatus>

FIG. 3 is a control block diagram illustrating a system configuration of the image forming apparatus 100. In FIG. 3, the engine control unit 203 includes a determination unit 204, a designation unit 205, and a driving control unit 206. The sheet discharge detection sensor 17 detects the sheet 2 that is jammed during two-sided printing. The driving control unit 206 operates the two-sided flapper solenoid 223 after the sheet 2 on the sheet conveyance path 25 is removed.

At this time, the determination unit 204 determines whether the two-sided flapper solenoid 223 and the two-sided flapper 51 are normally operating, based on a result of the detection of a sound by the microphone 70 that is produced when the position of the two-sided flapper 51 is changed. The normal operation in the present exemplary embodiment will be described below.

The designation unit 205 designates the determination unit 204 to perform state determination via an operation panel of the image forming apparatus 100. When the designation unit 205 designates the determination unit 204 to perform state determination, the determination unit 204 performs state determination, and a service member or technician can identify an apparatus state. The state determination in the present exemplary embodiment will be described below.

<Normal Operation>

Figure 4A:
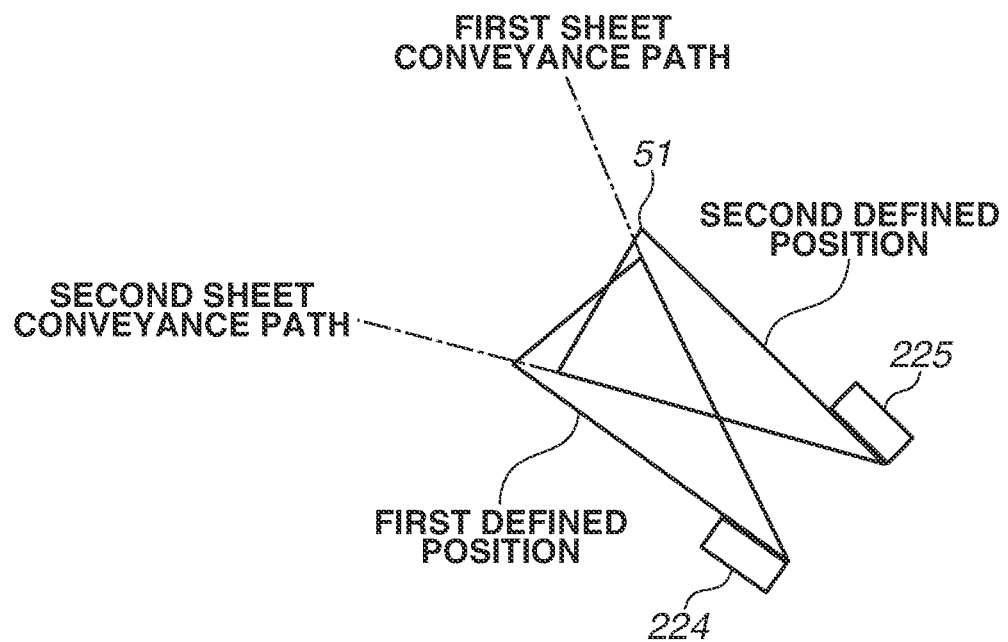
FIGS. 4A and 4B are views illustrating a normal operation.
Figure 4B:
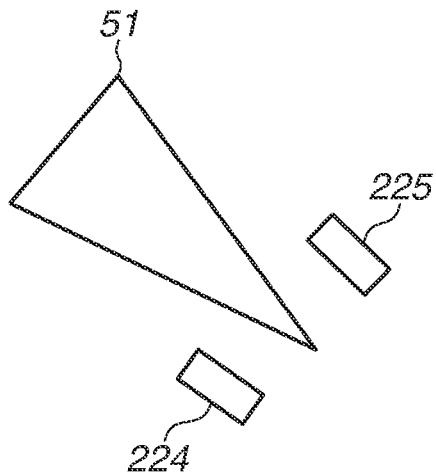

The normal operation in the present exemplary embodiment will be described below with reference to FIGS. 4A and 4B. FIG. 4A is a view illustrating a state where the two-sided flapper solenoid 223 and the two-sided flapper 51 are normally operating, whereas FIG. 4B is a view illustrating a state where the two-sided flapper solenoid 223 or the two-sided flapper 51 are not normally operating. During an ON operation, the two-sided flapper 51 is moved to a position (first defined position) to guide the sheet 2 to the reverse roller 62 on a first sheet conveyance path, whereas during an OFF operation, the two-sided flapper 51 is moved to a position (second defined position) to guide the sheet 2 to the sheet discharge roller 52 on a second sheet conveyance path. In other words, the two-sided flapper 51 is movable between the first defined position and the second defined position. In a case where the two-sided flapper solenoid 223 and the two-sided flapper 51 are normal, the two-sided flapper 51 is operated from the second defined position to the first defined position during the ON operation and from the first defined position to the second defined position during the OFF operation. Then, the two-sided flapper 51 hits a first regulation member 224 at the first defined position during the ON operation and hits a second regulation member 225 at the second defined position during the OFF operation. The two-sided flapper solenoid 223 produces an operation sound during the ON operation and during the OFF operation. Thus, the hitting sound of the two-sided flapper 51 and the operation sound of the two-sided flapper solenoid 223 make a sound that is louder than or equal to a predetermined sound volume. At this time, the two-sided flapper solenoid 223 and the two-sided flapper 51 are in a state of normally operating. The predetermined sound volume will be described below.

On the other hand, in a case where the two-sided flapper solenoid 223 or the two-sided flapper 51 is abnormal, an operation different from that in the normal case is performed. Specifically, since the two-sided flapper solenoid 223 is not operating, the two-sided flapper 51 does not operate. In this case, the two-sided flapper solenoid 223 and the two-sided flapper 51 do not produce a sound when the two-sided flapper 51 is switched.

In another case, while the two-sided flapper solenoid 223 is operating, the two-sided flapper 51 is not operating. In yet another case, while the two-sided flapper solenoid 223 is operating, the two-sided flapper 51 is stopped between the first defined position and the second defined position and thus does not hit the first regulation member 224 at the first defined position or the second regulation member 225 at the second defined position. In this case, the two-sided flapper solenoid 223 produces an operation sound during the ON operation and the OFF operation, but no hitting sound of the two-sided flapper 51 is produced.

In any of the cases, the sound produced when the two-sided flapper 51 is switched is lower in the case where the two-sided flapper solenoid 223 or the two-sided flapper 51 is abnormal than that in the case where the two-sided flapper solenoid 223 and the two-sided flapper 51 are normal. At this time, the two-sided flapper solenoid 223 or the two-sided flapper 51 is in a state of not normally operating.

<State Determination>

Figure 5:
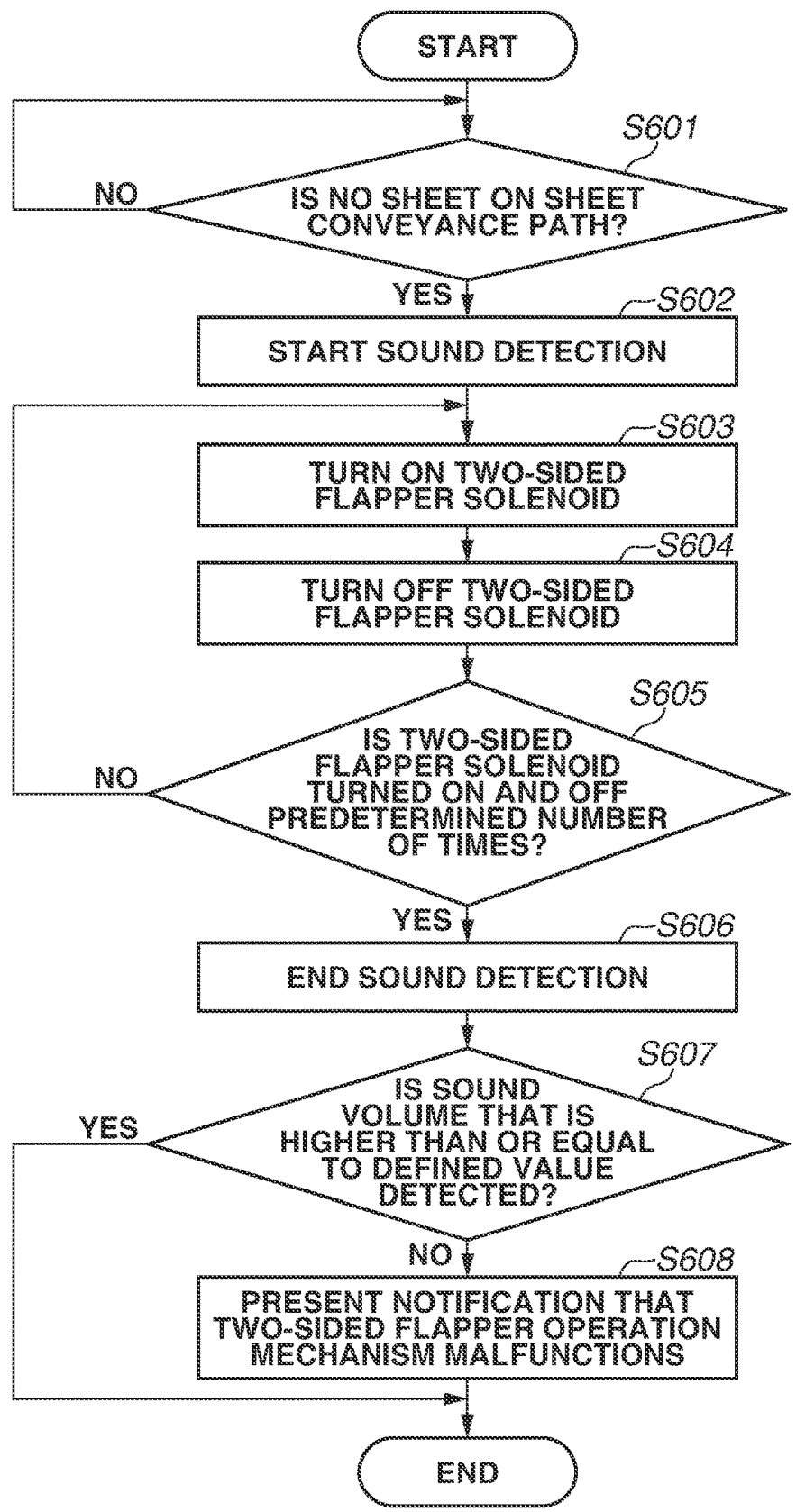
FIG. 5 is a flowchart illustrating a state determination process.

Next, the state determination by the determination unit 204, which is a feature of the present exemplary embodiment, will be described below with reference to FIGS. 5, 6A, and 6B. In the present exemplary embodiment, the state determination is performed under an environment where only the state determination target parts (the two-sided flapper solenoid 223 and the two-sided flapper 51) are operated. FIG. 5 is a flowchart illustrating the state determination. After the sheet discharge detection sensor 17 detects the sheet 2 that is jammed, the driving control unit 206 operates the two-sided flapper solenoid 223, and the determination unit 204 determines whether the two-sided flapper solenoid 223 and the two-sided flapper 51 are abnormal.

In step S601, the determination unit 204 detects whether the sheet 2 is on the sheet conveyance path 25 based on the registration sensor 16 and the sheet discharge detection sensor 17, which are a sheet detection unit. In step S602, after the sheet 2 on the sheet conveyance path 25 is removed, the determination unit 204 starts sound detection using the microphone 70. Then, in steps S603 to S605, the two-sided flapper solenoid 223 is turned on and off a predetermined number of times. In step S606, after the acquisition of a sound during the ON/OFF operations of the two-sided flapper solenoid 223 is completed, the determination unit 204 ends the sound detection.

FIG. 6A illustrates a sound volume detected when the two-sided flapper solenoid 223 and the two-sided flapper 51 are normally operating, whereas FIG. 6B illustrates a sound volume detected when the two-sided flapper solenoid 223 or the two-sided flapper 51 malfunctions and the two-sided flapper 51 are not normally operating. In step S607, the determination unit 204 determines whether a sound volume that is higher than or equal to a predetermined sound volume is detected during an operation to turn on/off the two-sided flapper solenoid 223. The predetermined sound volume is a sound volume that is lower than a sound volume in the normal case and is higher than a sound volume in the abnormal case, and the predetermined sound volume is set to a sound volume that is not erroneously detected by the determination unit 204. Hereinafter, the predetermined sound volume will be referred to as "defined value".

In a case where the microphone 70 detects a sound that is supposed to emanate during an ON/OFF operation of the two-sided flapper solenoid 223, the determination unit 204 determines that the two-sided flapper solenoid 223 and the two-sided flapper 51 are normally operating (YES in step S607). Thus, when the two-sided flapper solenoid 223 is turned on/off a plurality of number of times, if a sound volume that is higher than or equal to the defined value is not detected even once in the plurality of number of times, the determination unit 204 determines that the two-sided flapper solenoid 223 or the two-sided flapper 51 is not normally operating (NO in step S607). Then, in step S608, a notification that a two-sided flapper operation mechanism consisting of the two-sided flapper solenoid 223 and the two-sided flapper 51 malfunctions is displayed on an operation panel as a display unit 230 to notify a service member or technician of the malfunction. In this way, the service member or technician can recognize that the two-sided flapper operation mechanism malfunctions and repair a target part.

As described above, according to the present exemplary embodiment, in a case where a sound that is supposed to emanate when the two-sided flapper solenoid 223 is operated is not detected, an occurrence of an abnormality in the two-sided flapper operation mechanism is detected. Thus, in a case where a sound emanating from a part changes when the state of the part changes and the change in the sound is different from a change that is an increase in sound volume, a change in the state of the part is detected.

In the present exemplary embodiment, the method in which the state determination is performed under an environment where only a state determination target part is operated is described. If, however, no erroneous detection is likely to occur in the state determination, the state determination can be performed under an environment where a part other than a state determination target part is operated.

In the present exemplary embodiment, the method is described in which a sound produced when the two-sided flapper 51 is switched decreases in a case where the two-sided flapper solenoid 223 or the two-sided flapper 51 is abnormal. Alternatively, an abnormality in the two-sided flapper solenoid 223 or the two-sided flapper 51 can be detected even if no sound is produced when the two-sided flapper 51 is switched.

Figure 7:
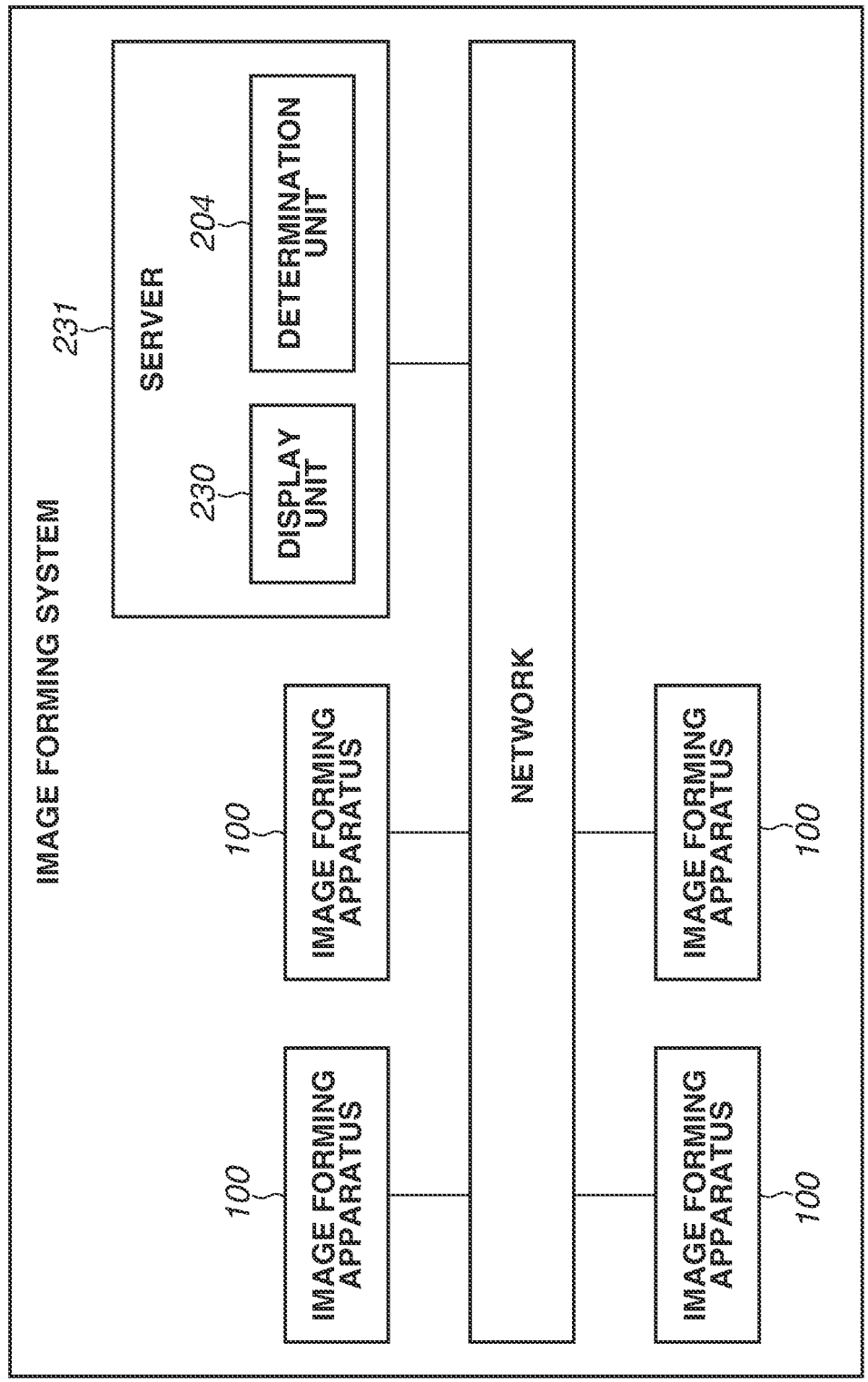
FIG. 7 is a view illustrating an image forming system.

In the present exemplary embodiment, the method is described in which the determination unit 204 in the image forming apparatus 100 determines an abnormality in the two-sided flapper operation mechanism. Alternatively, a server 231 outside the image forming apparatus 100 may include the determination unit 204. FIG. 7 illustrates an image forming system. Embodiments are realized as, for example, an image forming system including the image forming apparatus 100 and the server 231 connected to the image forming apparatus 100 via a network. The image forming apparatus 100 includes the two-sided flapper operation mechanism and the microphone 70, and the server 231 includes the determination unit 204. The image forming apparatus 100 transmits a detection result of a sound detected by the microphone 70 to the server 231 via the network. The server 231 determines whether the two-sided flapper operation mechanism is normally operating or is not normally operating based on the detection result of the sound detected by the microphone 70. If the server 231 determines that the two-sided flapper operation mechanism is normally operating, the server 231 notifies the image forming apparatus 100 that the two-sided flapper operation mechanism is normally operating. On the other hand, if the server 231 determines that the two-sided flapper operation mechanism is not normally operating, the server 231 notifies the image forming apparatus 100 that the two-sided flapper operation mechanism is not normally operating.

In the present exemplary embodiment, the method is described in which a notification that the two-sided flapper operation mechanism malfunctions is provided to a service man via the operation panel. Alternatively, the notification that the two-sided flapper operation mechanism malfunctions may be transmitted to the server 231 via the network.

In the present exemplary embodiment, the method is described in which an abnormality in the two-sided flapper operation mechanism is detected after the sheet 2 that is jammed is detected. Alternatively, an abnormality in the two-sided flapper operation mechanism may be detected even if the sheet 2 that is jammed is not detected.

In the present exemplary embodiment, the method is described in which an abnormality in the two-sided flapper operation mechanism is detected after it is confirmed that the sheet 2 on the sheet conveyance path 25 is removed in order to accurately detect a sound of the two-sided flapper 51. Alternatively, in a case where a sound of the two-sided flapper solenoid 223 and the two-sided flapper 51 is detectable, the sound detection can be started even if the sheet 2 is not removed.

In the present exemplary embodiment, the method is described in which the two-sided flapper solenoid 223 is operated a plurality of times and the detection of a sound volume that is higher than or equal to the defined value is performed. Alternatively, the two-sided flapper solenoid 223 can be operated only once and the detection of a sound volume that is higher than or equal to the defined value can be performed.

In the present exemplary embodiment, the method is described in which the determination unit 204 determines that the two-sided flapper operation mechanism is abnormal in a case where a sound volume that is higher than or equal to the defined value is not detected even once during the plurality of operations to turn on/off the two-sided flapper solenoid 223. Alternatively, the determination unit 204 can determine that the two-sided flapper operation mechanism is abnormal in a case where a sound volume that is higher than or equal to the defined value is not detected at least once.

In the present exemplary embodiment, the method of driving the two-sided flapper solenoid 223 by setting a signal to ON/OFF is described. In order to cause the two-sided flapper solenoid 223 to produce a sound louder than a sound during image forming, the determination unit 204 can set a current different from a current during image forming to the two-sided flapper solenoid 223 or can set a signal to increase the ON-width ratio during the ON setting.

In the present exemplary embodiment, the method is described in which the two-sided flapper 51 guides the sheet 2 to the reverse roller 62 during the ON operation or guides the sheet 2 to the sheet discharge roller 52 during the OFF operation. Alternatively, the two-sided flapper 51 can guide the sheet 2 to the reverse roller 62 during the OFF operation and can guide the sheet 2 to the sheet discharge roller 52 during the ON operation.

In a second exemplary embodiment, a state determination process will be described below in which whether an abnormality occurs in the registration roller 3 or the sheet feeding motor 209 is determined in a case where a conveyance failure occurs when a sheet is fed from the cassette sheet feeding tray 101. In the present exemplary embodiment, the term "conveyance unit" refers to the registration roller 3 and the sheet feeding motor 209. Description of each portion similar to that in the first exemplary embodiment is omitted.

<Configuration of Control Unit of Image Forming Apparatus>

Figure 8:
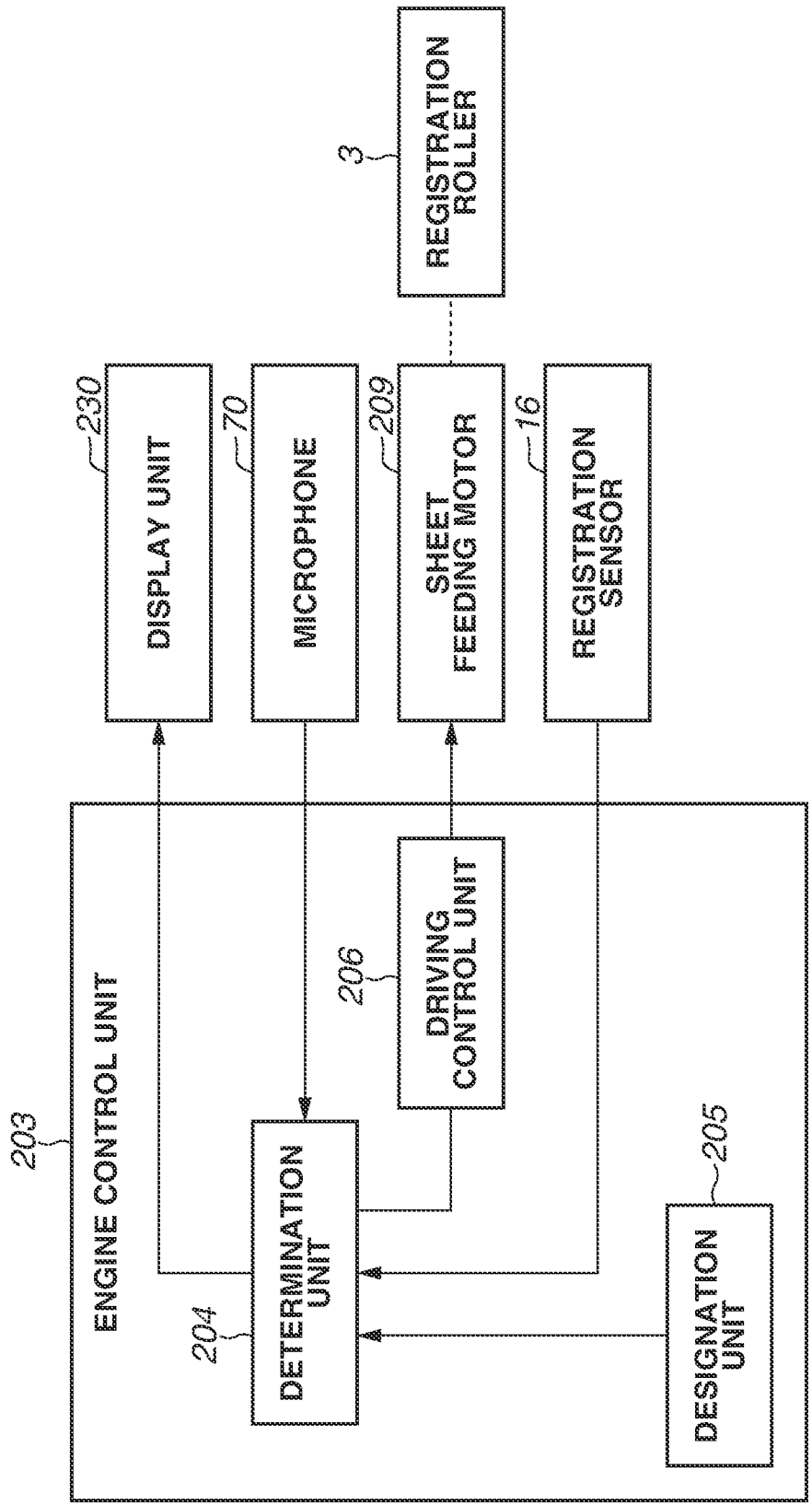
FIG. 8 is a control block diagram illustrating a system configuration of an image forming apparatus.

FIG. 8 is a control block diagram illustrating a system configuration of the image forming apparatus 100. In FIG. 8, the engine control unit 203 includes the determination unit 204, the designation unit 205, and the driving control unit 206. The registration sensor 16 detects a failure of the conveyance of the sheet 2 during a print operation. The driving control unit 206 drives the sheet feeding motor 209 after the sheet 2 on the sheet conveyance path 25 is removed. At this time, the determination unit 204 determines whether the sheet feeding motor 209 and the registration roller 3 are normally operating based on whether the microphone 70 detects a sound that emanates when the sheet feeding motor 209 and the registration roller 3 are driven.

<Normal Operation>

The normal operation in the present exemplary embodiment will be described below. In a case where the sheet feeding motor 209 and the registration roller 3 are normal, since the sheet feeding motor 209 and the registration roller 3 are operating, a sound that is louder than or equal to a defined value is produced. At this time, the sheet feeding motor 209 and the registration roller 3 are in a state of normally operating. The defined value will be described below.

On the other hand, in a case where the sheet feeding motor 209 or the registration roller 3 is abnormal, an operation different from that in the normal case is performed. Specifically, since the sheet feeding motor 209 is not operating, the registration roller 3 does not operate. In another case, while the sheet feeding motor 209 is operating, the registration roller 3 is not operating. In any of the cases, in the case where the sheet feeding motor 209 or the registration roller 3 is abnormal, a sound that emanates is smaller than that in the case where the sheet feeding motor 209 and the registration roller 3 are normal. At this time, the sheet feeding motor 209 or the registration roller 3 is in a state of not normally operating.

<State Determination>

Figure 9:
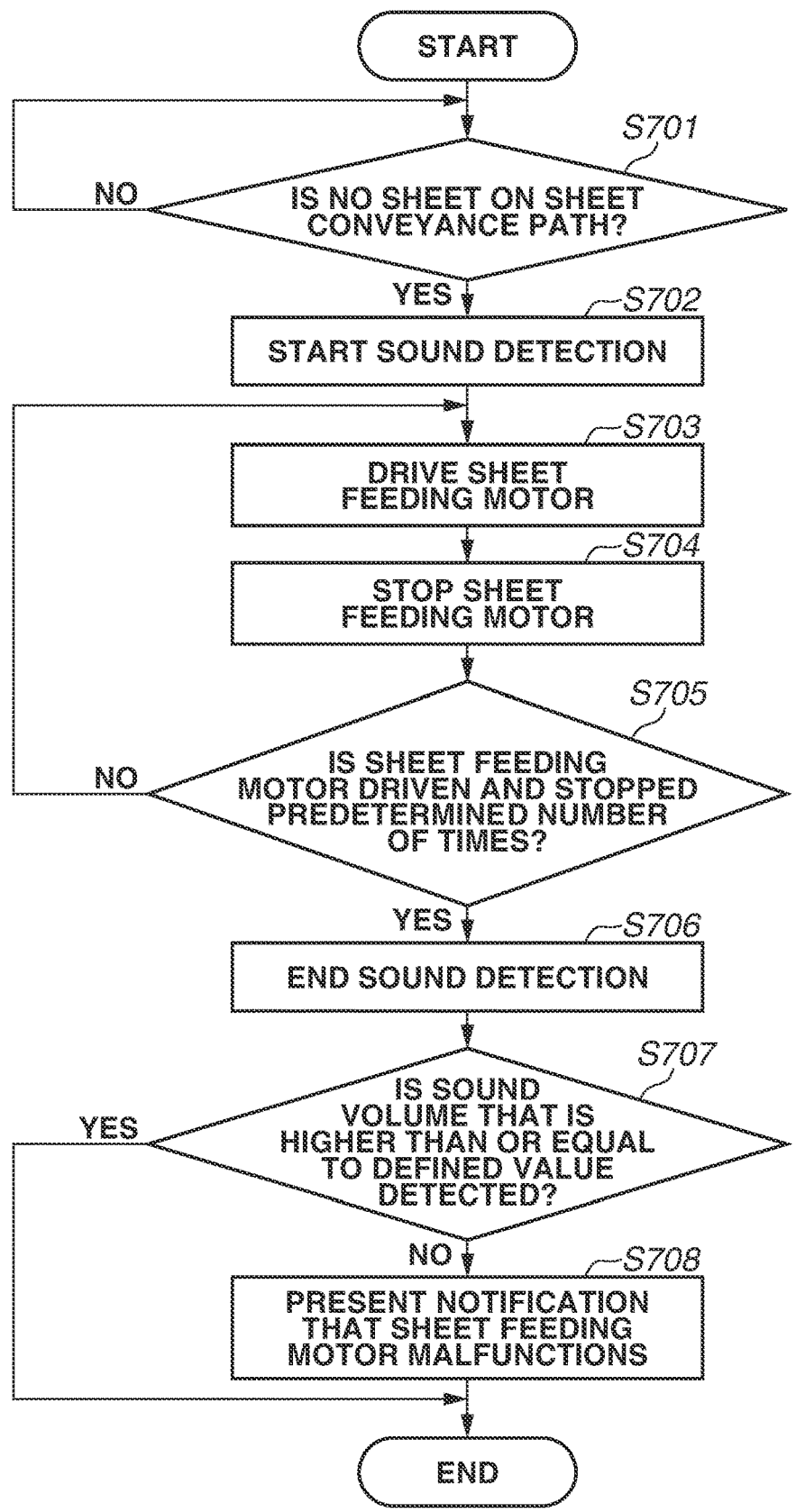
FIG. 9 is a flowchart illustrating a state determination process.

Next, a state determination process that is performed by the determination unit 204 and is a feature of the present exemplary embodiment will be described below with reference to FIGS. 9, 10A, and 10B. In the present exemplary embodiment, the state determination is performed under an environment where only the state determination target parts (the sheet feeding motor 209 and the registration roller 3) are operated. FIG. 9 is a flowchart illustrating the state determination process.

After the registration sensor 16 detects a failure of the conveyance of the sheet 2 during a print operation, the driving control unit 206 operates the sheet feeding motor 209, and the determination unit 204 determines whether an abnormality occurs in the sheet feeding motor 209 and the registration roller 3. In step S701, the determination unit 204 detects whether the sheet 2 is on the sheet conveyance path 25 based on the registration sensor 16, which is a sheet detection unit. In step S702, after the sheet 2 on the sheet conveyance path 25 is removed, the determination unit 204 starts sound detection using the microphone 70. Then, in steps S703 to S705, the sheet feeding motor 209 is repeatedly driven and stopped a predetermined number of times. In step S706, if the sound acquisition while the sheet feeding motor 209 is driven is completed, the determination unit 204 ends the sound detection.

Figure 10A:
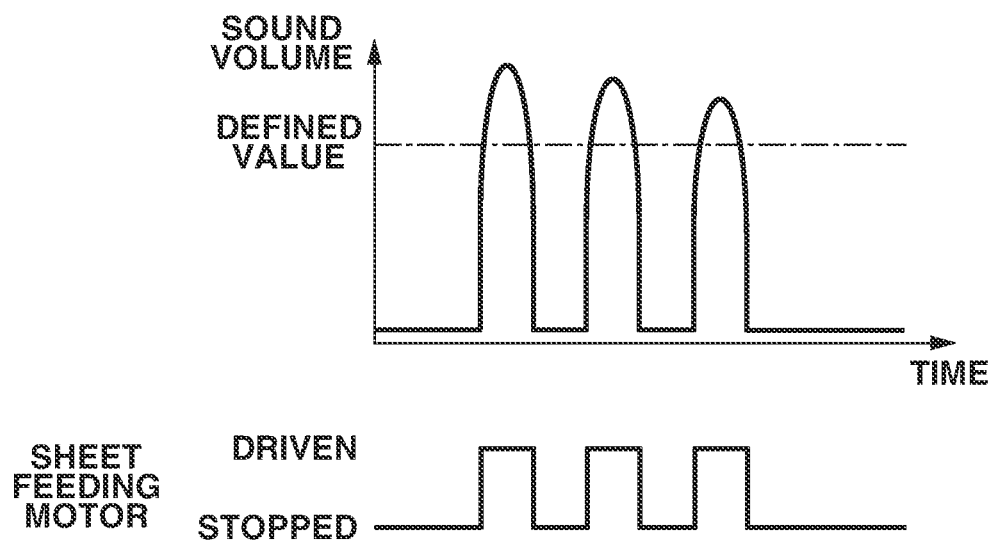
FIGS. 10A and 10B are views illustrating a process in the state determination.
Figure 10B:
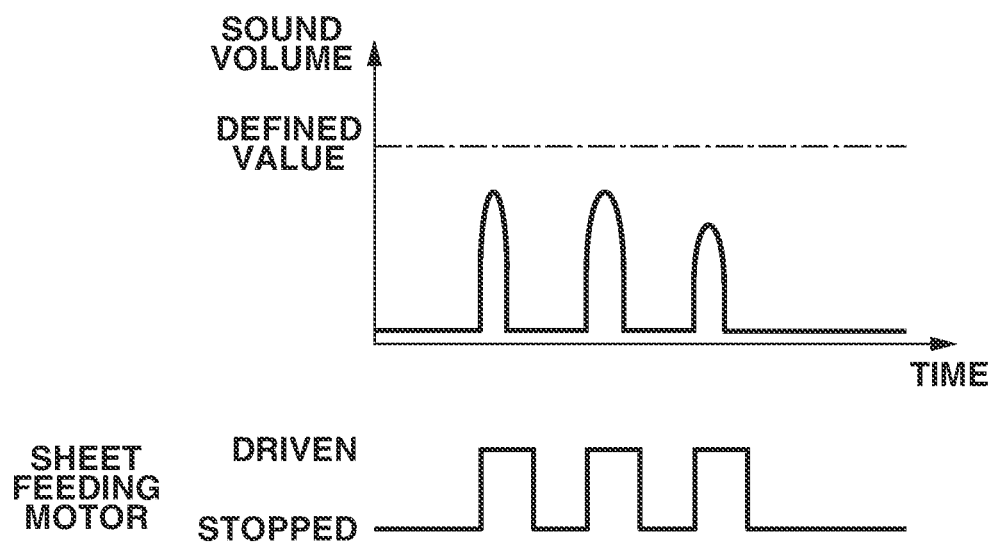

FIG. 10A illustrates a sound volume that is detected when the sheet feeding motor 209 and the registration roller 3 are normally operating, whereas FIG. 10B illustrates a sound volume that is detected when the sheet feeding motor 209 or the registration roller 3 malfunctions and is not normally operating. In step S707, the determination unit 204 determines whether a sound volume that is higher than or equal to the defined value is detected while the sheet feeding motor 209 is driven as illustrated in FIGS. 10A and 10B. The defined value is set to a sound volume that is lower than a sound volume in the normal case and higher than a sound volume in the abnormal case and is not likely to be erroneously detected by the determination unit 204.

The determination unit 204 determines that the sheet feeding motor 209 and the registration roller 3 are normally operating in a case where a sound that is supposed to emanate when the sheet feeding motor 209 is driven is detected (YES in step S707). Thus, in a case where a sound volume that is higher than or equal to the defined value is not detected even once while the sheet feeding motor 209 is driven a plurality of times (NO in step S707), the determination unit 204 determines that the sheet feeding motor 209 or the registration roller 3 is not normally operating. Then, in step S708, a notification that a sheet feeding motor driving mechanism consisting of the sheet feeding motor 209 and the registration roller 3 malfunctions is displayed on the operation panel as the display unit 230 to notify a service member or technician of the malfunction. In this way, the service member or technician can recognize that the sheet feeding motor driving mechanism malfunctions and repair a target part.

As described above, according to the present exemplary embodiment, in a case where a sound that is supposed to emanate when the sheet feeding motor 209 is driven is not detected, an occurrence of an abnormality in the sheet feeding motor driving mechanism is detected. Thus, even in a case where a sound emanating from a part changes when the state of the part changes and the change in the sound is different from a change that is an increase in sound volume, a change in the state of the part is detected.

In the present exemplary embodiment, the method is described in which a notification that the sheet feeding motor driving mechanism malfunctions is presented to a service member or technician via an operation panel. Alternatively, a notification that the sheet feeding motor driving mechanism malfunctions can be transmitted to the server 231 via the network.

In the present exemplary embodiment, the method is described in which the determination unit 204 in the image forming apparatus 100 determines whether the sheet feeding motor driving mechanism is abnormal. Alternatively, the server 231 on the network in the image forming system can include the determination unit 204 as illustrated in FIG. 7 and determine whether the sheet feeding motor driving mechanism is normally operating or is not normally operating as in the first exemplary embodiment.

In the present exemplary embodiment, the method is described in which a sound that emanates becomes small in a case where the sheet feeding motor 209 or the registration roller 3 is abnormal. Alternatively, an abnormality in the sheet feeding motor 209 or the registration roller 3 can be detected even if no sound is emanating.

In the present exemplary embodiment, the method is described in which an abnormality in the sheet feeding motor driving mechanism is detected after a failure of the conveyance of the sheet 2 is detected. Alternatively, an abnormality in the sheet feeding motor driving mechanism can be detected even if a failure of the conveyance of the sheet 2 is not detected.

In the present exemplary embodiment, the method is described in which the sheet feeding motor 209 is driven a plurality of times and a sound volume that is higher than or equal to the defined value is detected. Alternatively, the sheet feeding motor 209 can be driven only once and a sound volume that is higher than or equal to the defined value can be detected.

In the present exemplary embodiment, the method is described in which the determination unit 204 determines that the sheet feeding motor driving mechanism is abnormal in a case where a sound volume that is higher than or equal to the defined value is not detected even once while the sheet feeding motor 209 is driven a plurality of times. Alternatively, the determination unit 204 can determine that the sheet feeding motor driving mechanism is abnormal in a case where a sound volume that is higher than or equal to the defined value is not detected at least once.

In a third exemplary embodiment, a state determination process will be described below in which whether an abnormality occurs in the primary transfer unit 211, which applies voltage during image forming, is determined in a case where an image failure occurs on the sheet 2. Description of each portion similar to that in the first and second exemplary embodiments is omitted.

<Configuration of Control Unit of Image Forming Apparatus>

FIG. 11 is a control block diagram illustrating a system configuration of the image forming apparatus 100. In FIG. 11, the engine control unit 203 includes the determination unit 204, the designation unit 205, and the driving control unit 206. The driving control unit 206 applies the primary transfer voltage using the primary transfer unit 211 in a case where an image failure occurs on the sheet 2 and a service member or technician designates the designation unit 205 to perform state determination. At this time, the determination unit 204 determines whether the primary transfer unit 211 is normally operating based on whether a sound that emanates from the high-voltage circuit 212 when the primary transfer unit 211 applies the voltage is detected by the microphone 70.

<Normal Operation>

The normal operation in the present exemplary embodiment will be described below. In a case where the primary transfer unit 211 is normal, the high-voltage circuit 212 is operating. Thus, if the voltage is applied to the high-voltage circuit 212, a magnetized coil (not illustrated) in an electromagnetic transformer (not illustrated) vibrates, and a sound that is louder than or equal to the defined value emanates from the high-voltage circuit 212. At this time, the primary transfer unit 211 is in a state of normally operating. The defined value will be described below.

On the other hand, in a case where the primary transfer unit 211 is abnormal, an operation different from that in the normal case is performed. Specifically, since the high-voltage circuit 212 malfunctions, the high-voltage circuit 212 is not operating. Thus, in the case where the primary transfer unit 211 is abnormal, a sound of the high-voltage circuit 212 does not emanate. At this time, the primary transfer unit 211 is in a state of not normally operating.

<State Determination>

Figure 12:
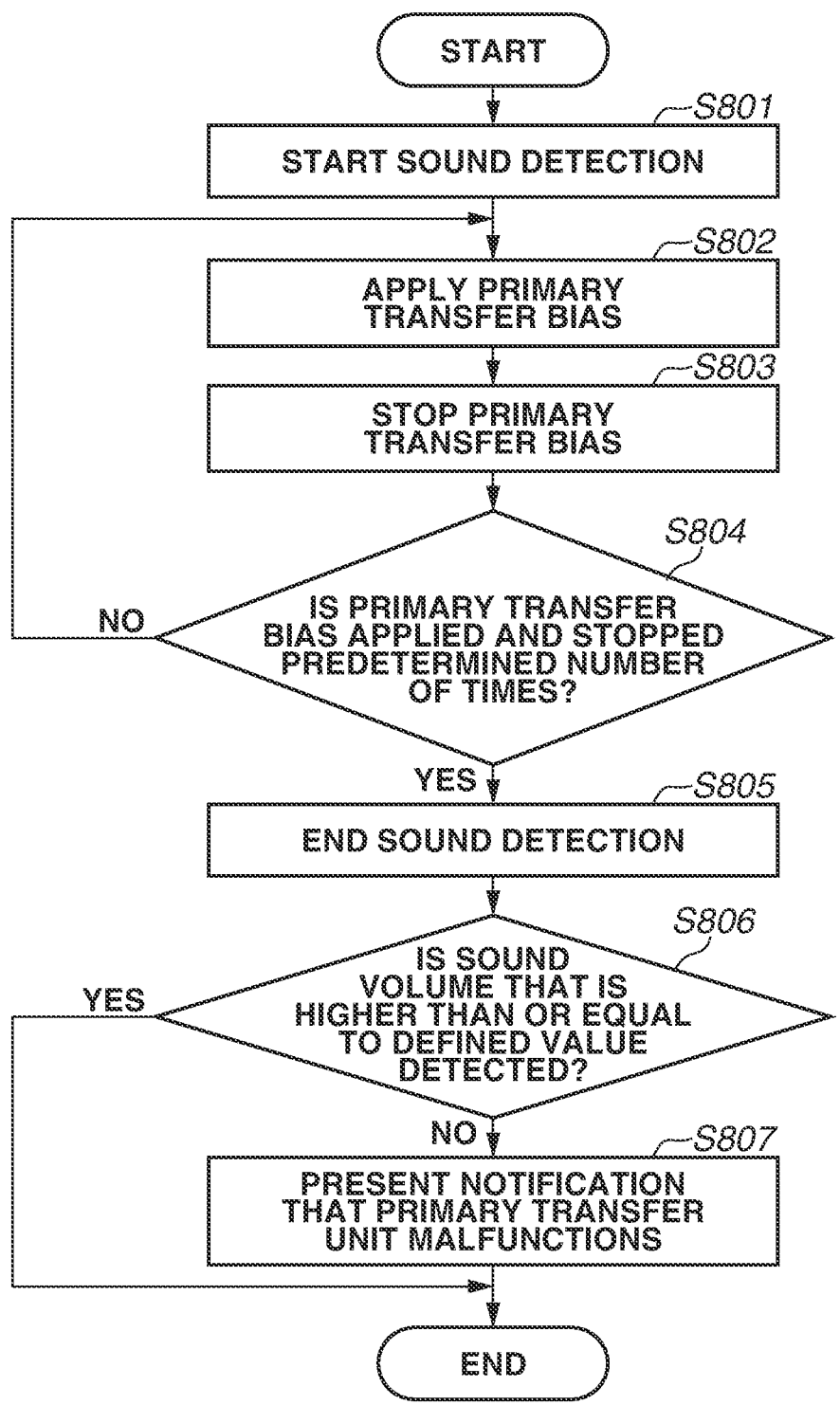
FIG. 12 is a flowchart illustrating a state determination process.

Next, a state determination process that is performed by the determination unit 204 and is a feature of the present exemplary embodiment will be described below with reference to FIGS. 12 and 13. In the present exemplary embodiment, the state determination is performed under an environment where only the state determination target part (the primary transfer unit 211) is operated. FIG. 12 is a flowchart illustrating a state determination process. When the designation unit 205 designates the state determination to be performed, the driving control unit 206 applies the primary transfer voltage using the primary transfer unit 211, and the determination unit 204 determines whether an abnormality occurs in the primary transfer unit 211.

In step S801, the determination unit 204 starts sound detection using the microphone 70. Then, in steps S802 to S804, the primary transfer unit 211 repeatedly applies the voltage and stops applying the voltage a predetermined number of times. In step S805, if the sound acquisition during the voltage application by the primary transfer unit 211 is completed, the determination unit 204 ends the sound detection.

Figure 13A:
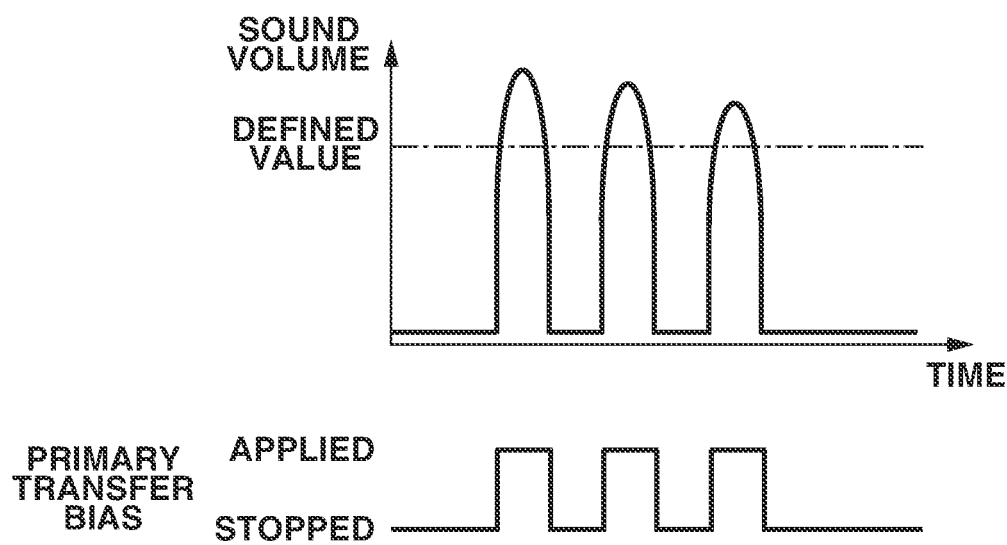
FIGS. 13A and 13B are views illustrating a process in the state determination.
Figure 13B:
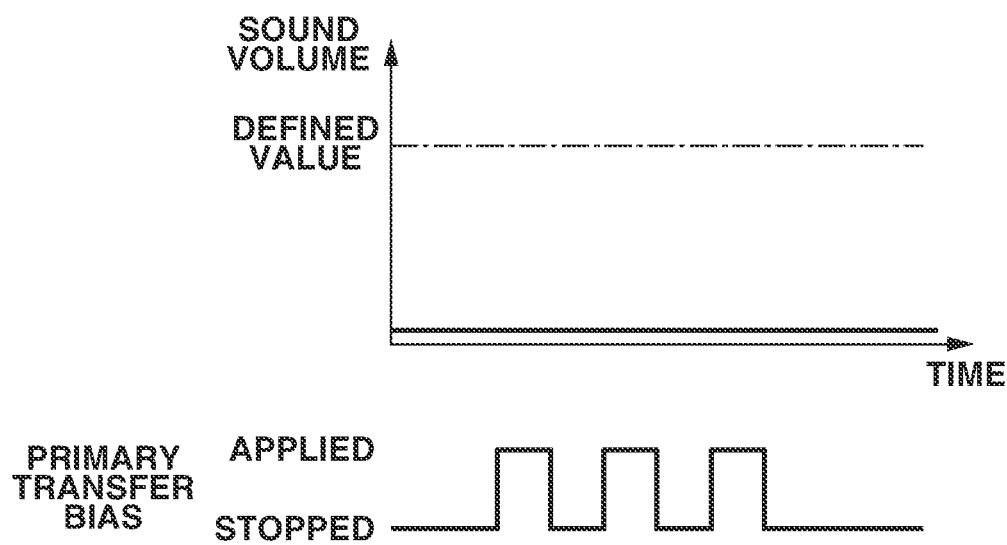

FIG. 13A illustrates a sound volume detected when the primary transfer unit 211 is normally operating, whereas FIG. 13B illustrates a sound volume detected when the primary transfer unit 211 malfunctions and is not normally operating. In step S806, the determination unit 204 determines whether a sound volume that is higher than or equal to the defined value is detected during the voltage application by the primary transfer unit 211 as illustrated in FIGS. 13A and 13B. The defined value is set to a sound volume that is lower than a sound volume in the normal case and higher than a sound volume in the abnormal case and is not likely to be erroneously detected by the determination unit 204.

The determination unit 204 determines that the primary transfer unit 211 is normally operating in a case where a sound of the high-voltage circuit 212 that is supposed to emanate when the primary transfer unit 211 applies the voltage is detected. Thus, in a case where a sound volume that is higher than or equal to the defined value is not detected even once while the primary transfer unit 211 applies the voltage a plurality of times, the determination unit 204 determines that the primary transfer unit 211 is not normally operating. Then, in step S807, a notification that the primary transfer unit 211 malfunctions is displayed on the operation panel as the display unit 230 to notify a service member or technician of the malfunction. In this way, the service member or technician can recognize that the primary transfer unit 211 malfunctions and repair a target part.

As described above, according to the present exemplary embodiment, in a case where a sound of the high-voltage circuit 212 that is supposed to emanate when the primary transfer unit 211 applies the primary transfer voltage is not detected, an occurrence of an abnormality in the primary transfer unit 211 is detected. Thus, in a case where a sound emanating from a part changes when the state of the part changes and the change in the sound is different from a change that is an increase in sound volume, a change in the state of the part is detected.

In the present exemplary embodiment, the method is described in which a notification that the primary transfer unit 211 malfunctions is presented to a service member or technician via the operation panel. Alternatively, a notification that the primary transfer unit 211 malfunctions can be transmitted to the server 231 via the network.

In the present exemplary embodiment, the method is described in which the determination unit 204 in the image forming apparatus 100 determines whether the primary transfer unit 211 is abnormal. Alternatively, the server 231 on the network in the image forming system can include the determination unit 204 as illustrated in FIG. 7 and determine whether the primary transfer unit 211 is normally operating or is not normally operating as in the first exemplary embodiment.

In the present exemplary embodiment, the method is described in which an abnormality in the primary transfer unit 211 is detected after an image failure occurs on the sheet 2. Alternatively, an abnormality in the primary transfer unit 211 can be detected even if an image failure does not occur on the sheet 2.

In the present exemplary embodiment, the method is described in which the primary transfer unit 211 applies the voltage a plurality of times and a sound volume that is higher than or equal to the defined value is detected. Alternatively, the primary transfer unit 211 can apply the voltage only once and a sound volume that is higher than or equal to the defined value can be detected.

In the present exemplary embodiment, the method is described in which the determination unit 204 determines that the primary transfer unit 211 is abnormal in a case where a sound volume that is higher than or equal to the defined value is not detected even once while the primary transfer unit 211 applies the voltage a plurality of times. Alternatively, the determination unit 204 can determine that the primary transfer unit 211 is abnormal in a case where a sound volume that is higher than or equal to the defined value is not detected at least once.

In the present exemplary embodiment, the primary transfer unit 211 is described as an application unit. Alternatively, the present exemplary embodiment is applicable to an application unit, such as a charging unit, a development unit, or a secondary transfer unit, from which a sound emanates when the application unit applies the voltage.

A fourth exemplary embodiment will be described. In the first, second, and third exemplary embodiments, whether a sound volume that is higher than or equal to the defined value is detected is determined, and whether an abnormality occurs is determined. However, even in a case where a sound volume that is higher than or equal to the defined value is detected, there is a possibility that an abnormality has occurred.

An example is a case where the two-sided flapper 51 is operating as the two-sided flapper solenoid 223 is switched but the operation of the two-sided flapper 51 is so slow that a sheet jam occurs. Specifically, the operation of the two-sided flapper 51 can delay in a case where oil is erroneously applied to the two-sided flapper solenoid 223. In another case, the two-sided flapper solenoid 223 is normally operating, but the frictional resistance against a movable portion of the two-sided flapper 51 increases, and the operation of the two-sided flapper 51 delays. In a case where the operation of the two-sided flapper 51 delays, the sheet 2 is guided to the sheet discharge roller 52 at a timing at which the sheet 2 is supposed to be guided to the reverse roller 62, or the sheet 2 is guided to the reverse roller 62 at a timing at which the sheet 2 is supposed to be guided to the sheet discharge roller 52, and a sheet jam occurs.

In the fourth exemplary embodiment, a response determination process will be described below in which whether an abnormality occurs in the two-sided flapper 51 or the two-sided flapper solenoid 223 is determined in a case where a sound volume that is higher than or equal to the defined value is detected. In the present exemplary embodiment, the term "switching unit" refers to the two-sided flapper 51 and the two-sided flapper solenoid 223. Description of each portion similar to that in the first exemplary embodiment is omitted.

<Normal Operation>

The normal operation in the present exemplary embodiment will be described below. In a case where the two-sided flapper solenoid 223 and the two-sided flapper 51 are normal, the two-sided flapper 51 is operating without an operation delay. Thus, a sound that is louder or equal to a defined value emanates when the two-sided flapper 51 is switched, and the length of time from when the two-sided flapper solenoid 223 starts switching to when a sound volume that is higher than or equal to the defined value is detected is less than or equal to a preset time length. At this time, the two-sided flapper solenoid 223 and the two-sided flapper 51 are in a state of normally operating. The defined value and the preset time length will be described below.

On the other hand, in a case where the two-sided flapper solenoid 223 or the two-sided flapper 51 is abnormal, an operation different from that in the normal case is performed. Specifically, the operation of the two-sided flapper 51 delays. Thus, a sound that is louder or equal to a defined value emanates when the two-sided flapper 51 is switched, and the length of time from when the two-sided flapper solenoid 223 starts switching to when a sound volume that is higher than or equal to the defined value is detected exceeds the preset time length. At this time, the two-sided flapper solenoid 223 or the two-sided flapper 51 is in a state of not normally operating.

<Response Determination>

Figure 14:
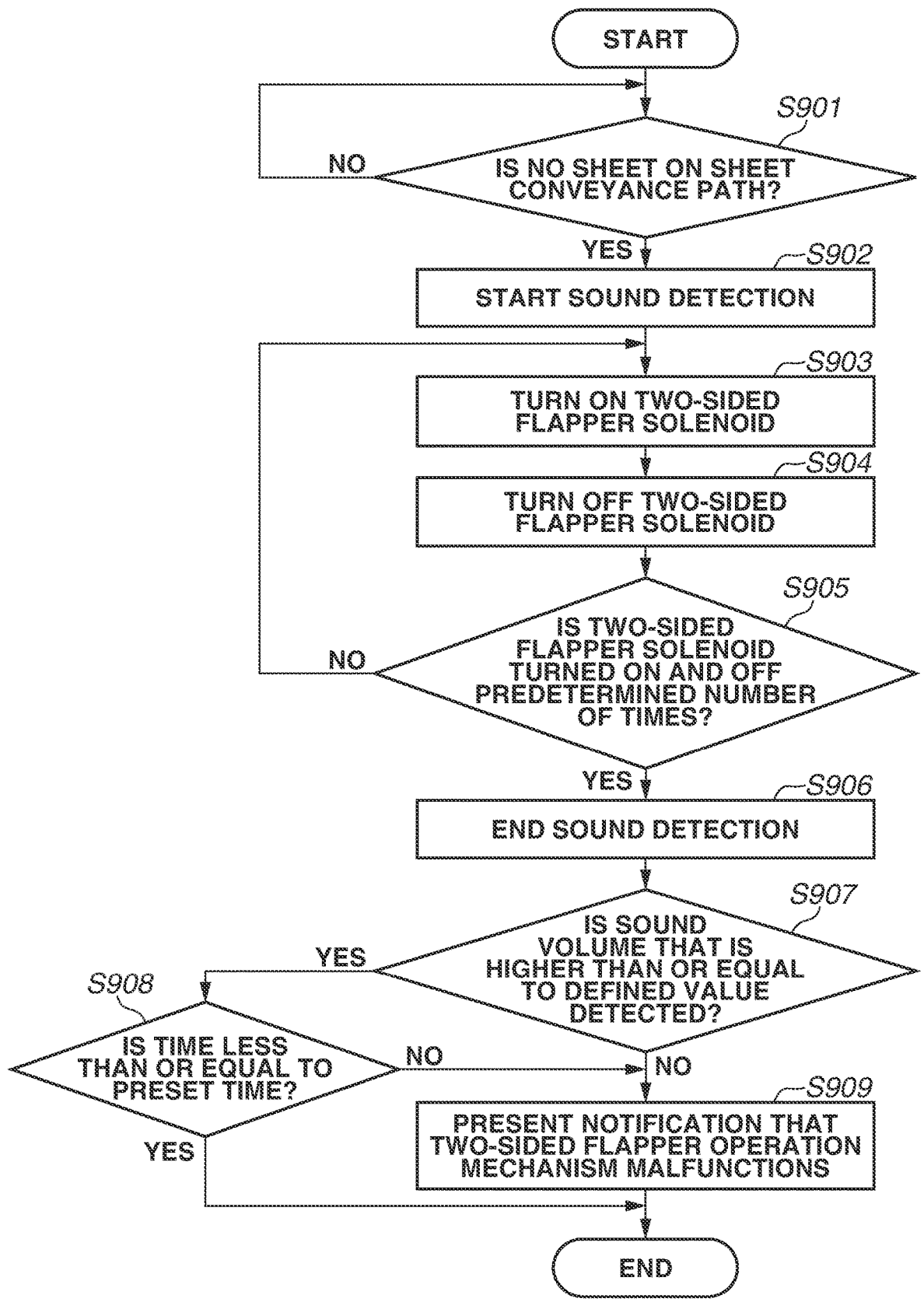
FIG. 14 is a flowchart illustrating a response determination process.

Next, the response determination that is performed by the determination unit 204 and is a feature of the present exemplary embodiment will be described below with reference to FIGS. 14, 15A, and 15B. In the present exemplary embodiment, the response determination is performed under an environment where only the response determination target parts (the two-sided flapper solenoid 223 and the two-sided flapper 51) are operated. FIG. 14 is a flowchart illustrating a response determination process. After the sheet discharge detection sensor 17 detects the sheet 2 that is jammed, the driving control unit 206 operates the two-sided flapper solenoid 223, and the determination unit 204 determines whether an abnormality occurs in the two-sided flapper solenoid 223 and the two-sided flapper 51.

In step S901, the determination unit 204 determines whether the sheet 2 is on the sheet conveyance path 25 based on the registration sensor 16 and the sheet discharge detection sensor 17, which are a sheet detection unit. In step S902, after the sheet 2 on the sheet conveyance path 25 is removed, the determination unit 204 starts sound detection using the microphone 70. Then, in steps S903 to S905, the two-sided flapper solenoid 223 is repeatedly turned on and off a predetermined number of times. In step S906, if the sound acquisition during the switching of the two-sided flapper solenoid 223 is completed, the determination unit 204 ends the sound detection. In step S907, the determination unit 204 determines whether a sound volume that is higher than or equal to the defined value is detected during the switching of the two-sided flapper solenoid 223. The defined value is set to a sound volume that is lower than a sound volume in the normal case and higher than a sound volume in the abnormal case and is not likely to be erroneously detected by the determination unit 204.

A case will be described below where a sound volume that is higher than or equal to the defined value is detected while the two-sided flapper solenoid 223 is switched a plurality of times (YES in step S907). In this case, in step S908, whether the length of time (Ton_n and Toff_n) from when the switching of the two-sided flapper solenoid 223 is started to when a sound volume that is higher than or equal to the defined value is detected is less than or equal to the preset time length (Ton and Toff) is detected, where n is the number of times the two-sided flapper solenoid 223 is switched on/off.

The preset time length will be described below. T1 is the length of time from when the switching of the two-sided flapper 51 is started to when the switching of the two-sided flapper 51 is completed, whereas T2 is the length of time from when the switching of the two-sided flapper 51 is started to when the sheet 2 reaches the two-sided flapper 51. In a case where the length of time from when the switching of the two-sided flapper solenoid 223 is started to when a sound volume that is higher than or equal to the defined value is detected is less than or equal to the preset time length (YES in step S908), T1<T2, and a sheet jam does not occur and the sheet 2 is conveyed to the reverse roller 62 or the sheet discharge roller 52. On the other hand, in a case where the length of time from when the switching of the two-sided flapper solenoid 223 is started to when a sound volume that is higher than or equal to the defined value is detected exceeds the preset time length (NO in step S908), T1>T2, and a sheet jam occurs. The preset time length is set to satisfy the above-described condition.

Figure 15A:
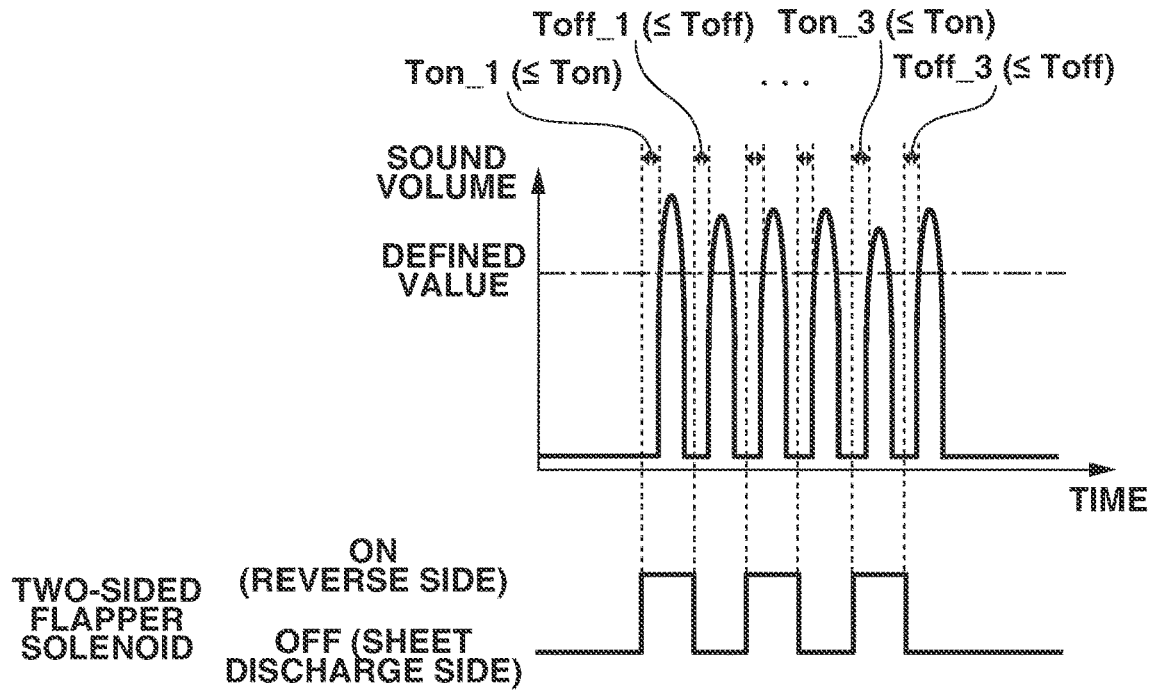
FIGS. 15A and 15B are views illustrating a process in the response determination.
Figure 15B:
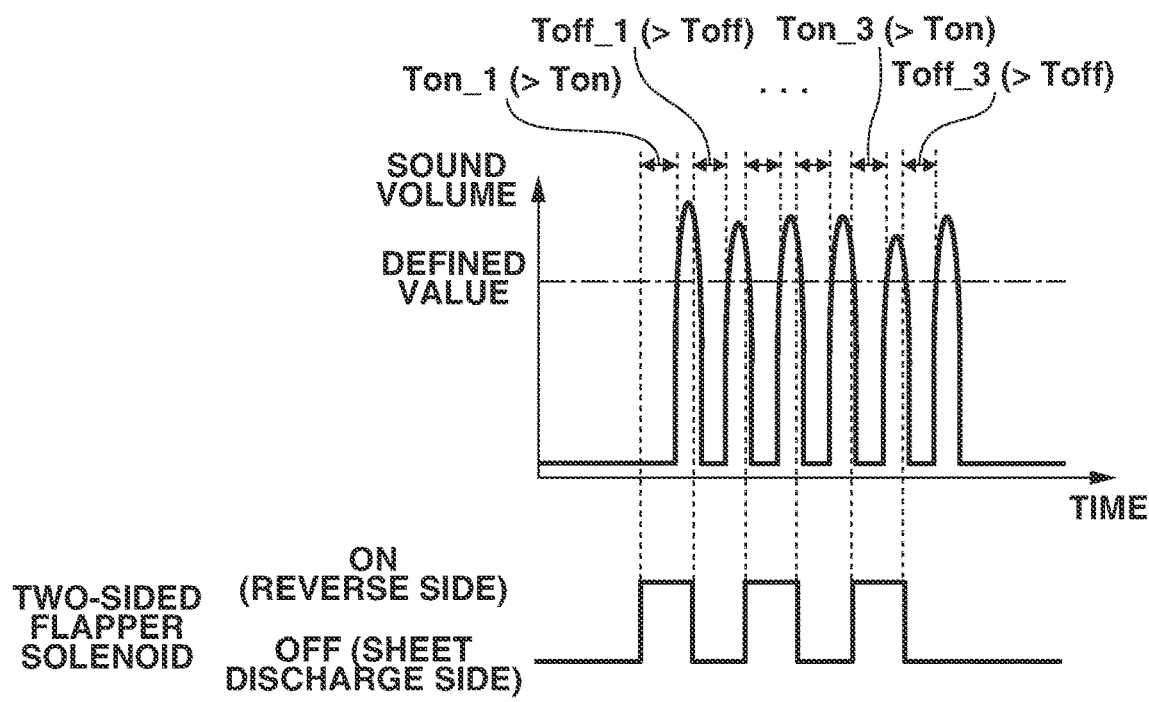

FIG. 15A illustrates a sound volume detected when the two-sided flapper solenoid 223 and the two-sided flapper 51 are normally operating without an operation delay. FIG. 15B illustrates a sound volume detected when the two-sided flapper solenoid 223 or the two-sided flapper 51 malfunctions to cause an operation delay in the two-sided flapper 51 and normal operation is not being performed.

In a case where the length of time from when the switching of the two-sided flapper solenoid 223 is started to when a sound volume that is higher than or equal to the defined value is detected is less than or equal to the preset time length (Ton_n≤Ton or Toff_n≤Toff) as illustrated in FIG. 15A, the determination unit 204 determines the two-sided flapper solenoid 223 and the two-sided flapper 51 are normally operating. On the other hand, in a case where Ton_n≤Ton or Toff_n≤Toff is not detected even once in the plurality of times as illustrated in FIG. 15B, the determination unit 204 determines that the two-sided flapper solenoid 223 or the two-sided flapper 51 is not normally operating.

A case will be described below where the two-sided flapper solenoid 223 is switched a plurality of times and a sound volume that is higher than or equal to the defined value is not detected even once in the plurality of times. In this case, the determination unit 204 determines that the two-sided flapper solenoid 223 or the two-sided flapper 51 is not normally operating.

Then, in the case where the determination unit 204 determines that the two-sided flapper solenoid 223 or the two-sided flapper 51 is not normally operating (NO in step S907), in step S909, a notification that the two-sided flapper operation mechanism consisting of the two-sided flapper solenoid 223 and the two-sided flapper 51 malfunctions is displayed on the operation panel as the display unit 230 to notify a service member or technician of the malfunction. In this way, the service member or technician can recognize that the two-sided flapper operation mechanism malfunctions and repair a target part.

As described above, according to the present exemplary embodiment, in a case where a delay in a sound that is supposed to emanate when the two-sided flapper solenoid is operated is detected, an occurrence of an abnormality in the two-sided flapper operation mechanism is detected. Thus, in a case where a sound emanating from a part changes when the state of the part changes and the change in the sound is different from a change that is an increase in sound volume, a change in the state of the part is detected.

In the present exemplary embodiment, the method is described in which the response determination is performed under an environment where only the response determination target parts are operating. Alternatively, the response determination can be performed under an environment where a part other than the response determination target parts is operating as long as no erroneous detection is likely to occur in the response determination.

In the present exemplary embodiment, the method is described in which a notification that the two-sided flapper operation mechanism malfunctions is presented to the service member or technician via the operation panel. Alternatively, the notification that the two-sided flapper operation mechanism malfunctions may be transmitted to the server 231 via the network.

In the present exemplary embodiment, the method is described in which the determination unit 204 in the image forming apparatus 100 determines whether the two-sided flapper operation mechanism is abnormal. Alternatively, the server 231 on the network in the image forming system can include the determination unit 204 as illustrated in FIG. 7 and determine whether the two-sided flapper operation mechanism is normally operating or is not normally operating as in the first exemplary embodiment.

In the present exemplary embodiment, the method is described in which an abnormality in the two-sided flapper operation mechanism is detected after the sheet 2 that is jammed is detected. Alternatively, an abnormality in the two-sided flapper operation mechanism may be detected even if the sheet 2 that is jammed is not detected.

In the present exemplary embodiment, the method is described in which an abnormality in the two-sided flapper operation mechanism is detected after it is confirmed that the sheet 2 on the sheet conveyance path 25 is removed in order to accurately detect a sound of the two-sided flapper 51. Alternatively, in a case where a sound of the two-sided flapper solenoid 223 and the two-sided flapper 51 is detectable, the sound detection may be started even if the sheet 2 is not removed.

In the present exemplary embodiment, the method is described in which the two-sided flapper solenoid 223 is switched a plurality of times and a sound volume that is higher than or equal to the defined value is detected. Alternatively, the two-sided flapper solenoid 223 may be switched only once and a sound volume that is higher than or equal to the defined value may be detected.

In the present exemplary embodiment, the method is described in which an abnormality in the two-sided flapper operation mechanism is determined in a case where the length of time from when the switching of the two-sided flapper solenoid 223 is started to when a sound volume that is higher than or equal to the defined value is not detected as being less than or equal to the preset time length even once in the plurality of times. Alternatively, an abnormality in the two-sided flapper operation mechanism can be determined in a case where the length of time from when the switching is started to when a sound volume that is higher than or equal to the defined value is detected is not detected as being less than or equal to the preset time length at least once.

The present disclosure works towards addressing an issue that a change in the state of a part cannot be detected in a case where a sound that emanates from the part does not become louder but changes in a different way when the state of the part changes.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-074990, filed Apr. 10, 2019, which is hereby incorporated by reference herein in its entirety.

What is claimed is:

1. An image forming apparatus comprising:
a conveyance unit having a roller configured to convey a sheet;
a conveyance path along which the sheet conveyed by the conveyance unit passes;
a sheet detection unit configured to detect the sheet conveyed along the conveyance path;
a detection unit having electronics configured to detect a sound that emanates when the conveyance unit operates; and
a control unit configured to determine a state of the conveyance unit,
wherein, in a case where a volume of the sound detected by the detection unit after the state determined by the control unit changes from a state of sheet presence on the conveyance path to a state of sheet absence on the conveyance path is not higher than or equal to a predetermined sound volume, the control unit determines that the conveyance unit is not normally operating, and
wherein, in a case where the detected sound volume is higher than or equal to the predetermined sound volume, the control unit determines that the conveyance unit is normally operating.

2. The image forming apparatus according to claim 1, wherein the control unit is configured to perform the state determination under an environment where only the conveyance unit, being a detection target part, is operated.

3. The image forming apparatus according to claim 1, wherein the detection unit is configured to detect the sound a plurality of times, and
wherein, in a case where the detected sound volume is not higher than or equal to the predetermined sound volume even once in the plurality of times the sound is detected, the control unit determines that the conveyance unit is not normally operating.

4. The image forming apparatus according to claim 1, wherein the detection unit is configured to detect the sound a plurality of times, and
wherein, in a case where the detected sound volume is not higher than or equal to the predetermined sound volume at least once, the control unit determines that the conveyance unit is not normally operating.

5. The image forming apparatus according to claim 1, further comprising a display unit configured to display a result of the control unit performing the state determination,
wherein, in a case where the control unit determines that the conveyance unit is not normally operating, the control unit displays, on the display unit, information indicating that the conveyance unit is not normally operating.

6. The image forming apparatus according to claim 1, wherein the detection unit is a microphone.

7. The image forming apparatus according to claim 1, wherein the conveyance unit is a two-sided flapper solenoid and a two-sided flapper,
wherein the two-sided flapper is configured to move between a first defined position where the two-sided flapper guides the sheet to a first sheet conveyance path and a second defined position where the two-sided flapper guides the sheet to a second sheet conveyance path,
wherein, in a case where the conveyance unit is normally operating, the two-sided flapper operates from the second defined position to the first defined position and hits a first regulation member at the first defined position, or the two-sided flapper operates from the first defined position to the second defined position and hits a second regulation member at the second defined position, and
wherein, in a case where the conveyance unit is not normally operating, at least one of the following is part of the not normally operating: (i) the two-sided flapper solenoid and the two-sided flapper are not operating, (ii) the two-sided flapper solenoid is operating while the two-sided flapper is not operating, or (iii) the two-sided flapper solenoid is operating while the two-sided flapper is stopped between the first defined position and the second defined position and does not hit the first regulation member at the first defined position or the second regulation member at the second defined position.

8. The image forming apparatus according to claim 1,
wherein the conveyance unit is a sheet feeding motor and a registration roller,
wherein, in a case where the conveyance unit is normally operating, the sheet feeding motor and the registration roller are operating, and
wherein, in a case where the conveyance unit is not normally operating, the sheet feeding motor and the registration roller are not operating, or the sheet feeding motor is operating while the registration roller is not operating.

* * * * *